US008615418B1

(12) United States Patent
Niznik et al.

(10) Patent No.: US 8,615,418 B1
(45) Date of Patent: Dec. 24, 2013

(54) SYSTEM AND METHOD FOR MANAGING TRANSPORTATION TRANSACTIONS

(75) Inventors: Timothy J. Niznik, Highland Village, TX (US); Tuell C. Green, Euless, TX (US); Murali Ande, Flower Mound, TX (US); Kunal Shah, Irving, TX (US); James T. Diamond, Grapevine, TX (US); Laidlaw R. Fletcher, Santa Fe, NM (US)

(73) Assignee: American Airlines, Inc., Fort Worth, TX (US)

( * ) Notice: Subject to any disclaimer, the term of this patent is extended or adjusted under 35 U.S.C. 154(b) by 1219 days.

(21) Appl. No.: 12/183,645

(22) Filed: Jul. 31, 2008

(51) Int. Cl.
*G06Q 10/00* (2012.01)
*G06Q 50/00* (2012.01)
*G06G 7/76* (2006.01)

(52) U.S. Cl.
USPC ............. 705/7.22; 705/5; 705/7.12; 701/120

(58) Field of Classification Search
USPC .................... 705/5, 6, 7.11, 7.12, 7.22–7.25; 701/120
See application file for complete search history.

(56) References Cited

U.S. PATENT DOCUMENTS

| | | | |
|---|---|---|---|
| 6,044,353 A | 3/2000 | Pugliese | |
| 6,108,636 A | 8/2000 | Yap et al. | |
| 6,161,097 A * | 12/2000 | Glass et al. | 705/6 |
| 6,314,361 B1 * | 11/2001 | Yu et al. | 701/120 |
| 6,408,276 B1 * | 6/2002 | Yu et al. | 705/7.16 |
| 6,721,714 B1 * | 4/2004 | Baiada et al. | 705/7.13 |
| 2002/0107714 A1 | 8/2002 | Whitlock et al. | |
| 2002/0177943 A1 * | 11/2002 | Beardsworth | 701/120 |
| 2003/0139875 A1 * | 7/2003 | Baiada et al. | 701/120 |
| 2003/0167109 A1 * | 9/2003 | Clarke et al. | 701/3 |
| 2003/0225598 A1 * | 12/2003 | Yu et al. | 705/5 |
| 2004/0054550 A1 * | 3/2004 | Cole et al. | 705/1 |
| 2005/0192701 A1 | 9/2005 | Ben-Ezra | |
| 2005/0216281 A1 * | 9/2005 | Prior | 705/1 |
| 2005/0246224 A1 | 11/2005 | McKanna et al. | |
| 2007/0043598 A1 | 2/2007 | Bertram et al. | |
| 2007/0219833 A1 * | 9/2007 | Trautman | 705/5 |
| 2009/0125357 A1 * | 5/2009 | Vannette et al. | 705/8 |

FOREIGN PATENT DOCUMENTS

WO WO 2008061793 A1 * 5/2008

OTHER PUBLICATIONS

Erikse, Collaborative Decision Making Information Management in Airports, 2002, IEEE 0-7803-7367-7/02.*
Fuhr, Robust Flight Scheduling—An Analytic Approach to Performance Evaluation and Optimization, Apr. 23, 2007.*
Schaefer, et al., Improving Airlines Operational Performance through Schedule Perturbation, Oct. 28, 2002.*
Arguello, et al., A GRASP for Aircraft Routing in Response to Groundings and Delays, 1997, J. of Combinatorial Optimization 5, 211-228.*
Jeff Bailey, "Airlines Work on Systems to Reduce Delays" The New York Times, Nov. 15, 2007, 4 pages, nytimes.com, N.Y., USA.
U.S. Appl. No. 12/349,926, filed Jan. 7, 2009, Tansupaswatdikul et al.
U.S. Appl. No. 12/350,160, filed Jan. 7, 2009, Ande et al.
U.S. Appl. No. 12/350,178, filed Jan. 7, 2009, Osborne et al.

(Continued)

Primary Examiner — Daniel Vetter
(74) Attorney, Agent, or Firm — Haynes and Boone, LLP

(57) ABSTRACT

A system for managing transportation transactions is described. In an exemplary embodiment, one or more diverted transportation transactions, such as, for example, one or more diverted airline flights, are managed.

18 Claims, 23 Drawing Sheets

(56) References Cited

OTHER PUBLICATIONS

U.S. Appl. No. 61/143,075, filed Jan. 7, 2009, Green et al.
Office Action mailed Jun. 14, 2011, by the USPTO, regarding U.S. Appl. No. 12/350,178.
Office Action mailed Jun. 14, 2011, by the USPTO, regarding U.S. Appl. No. 12/350,160.
Office Action mailed Jul. 19, 2011, by the USPTO, regarding U.S. Appl. No. 12/349,926.

* cited by examiner

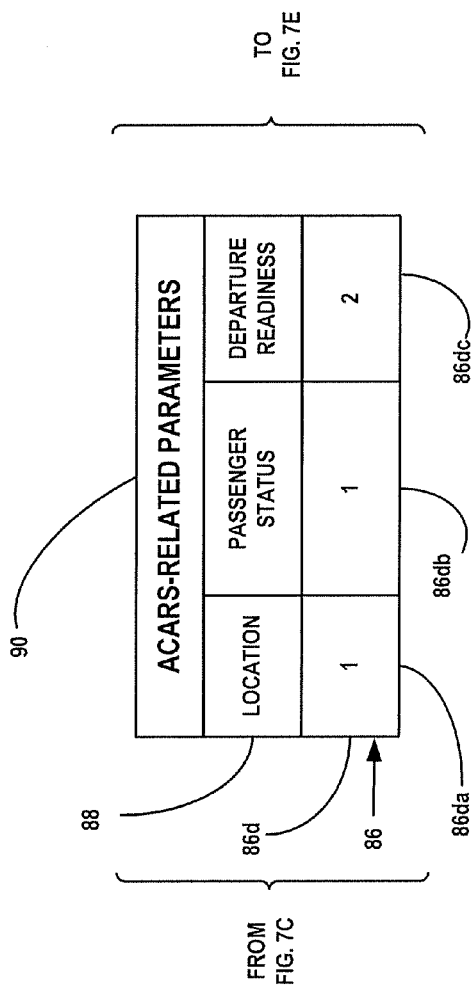

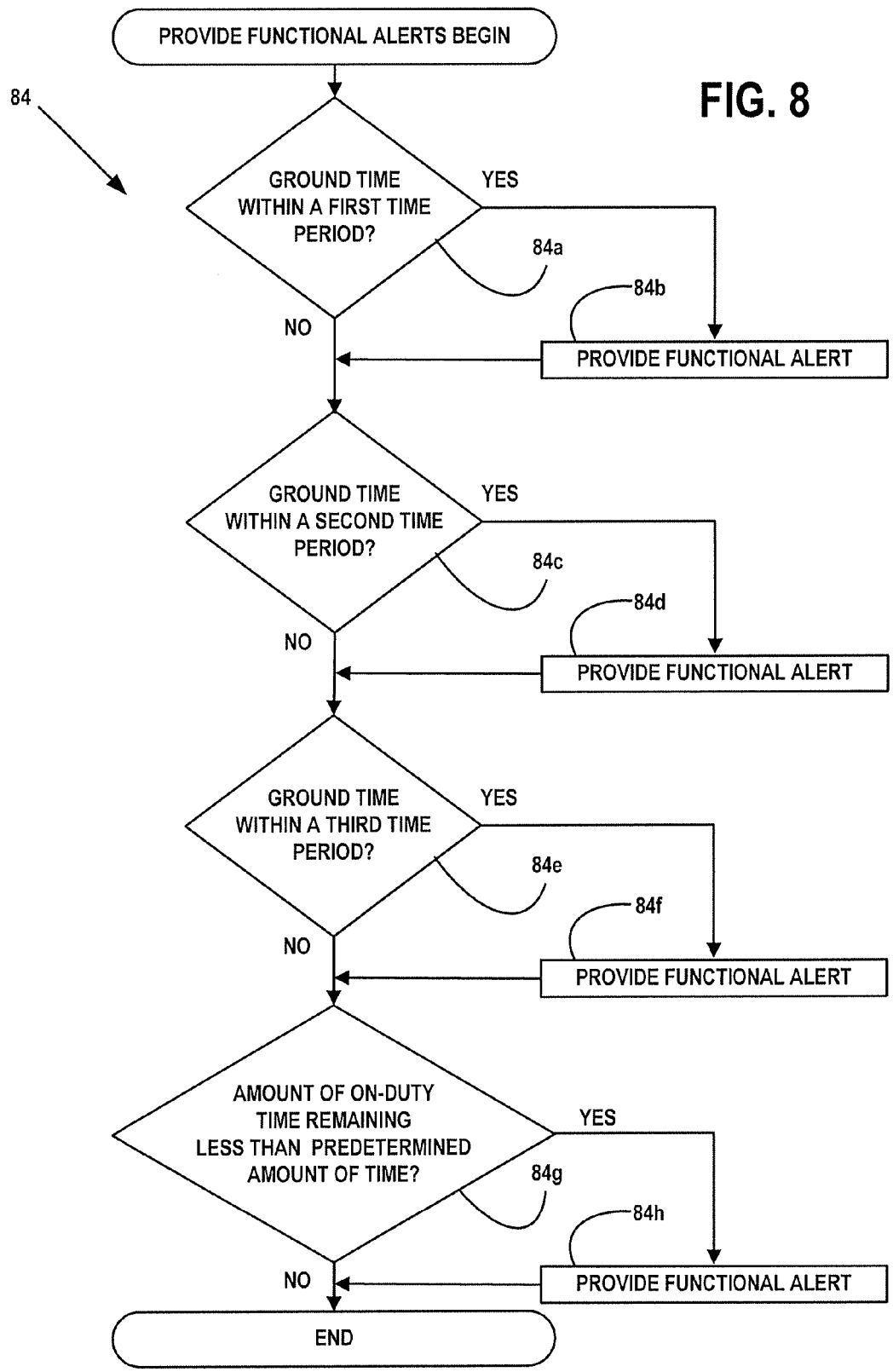

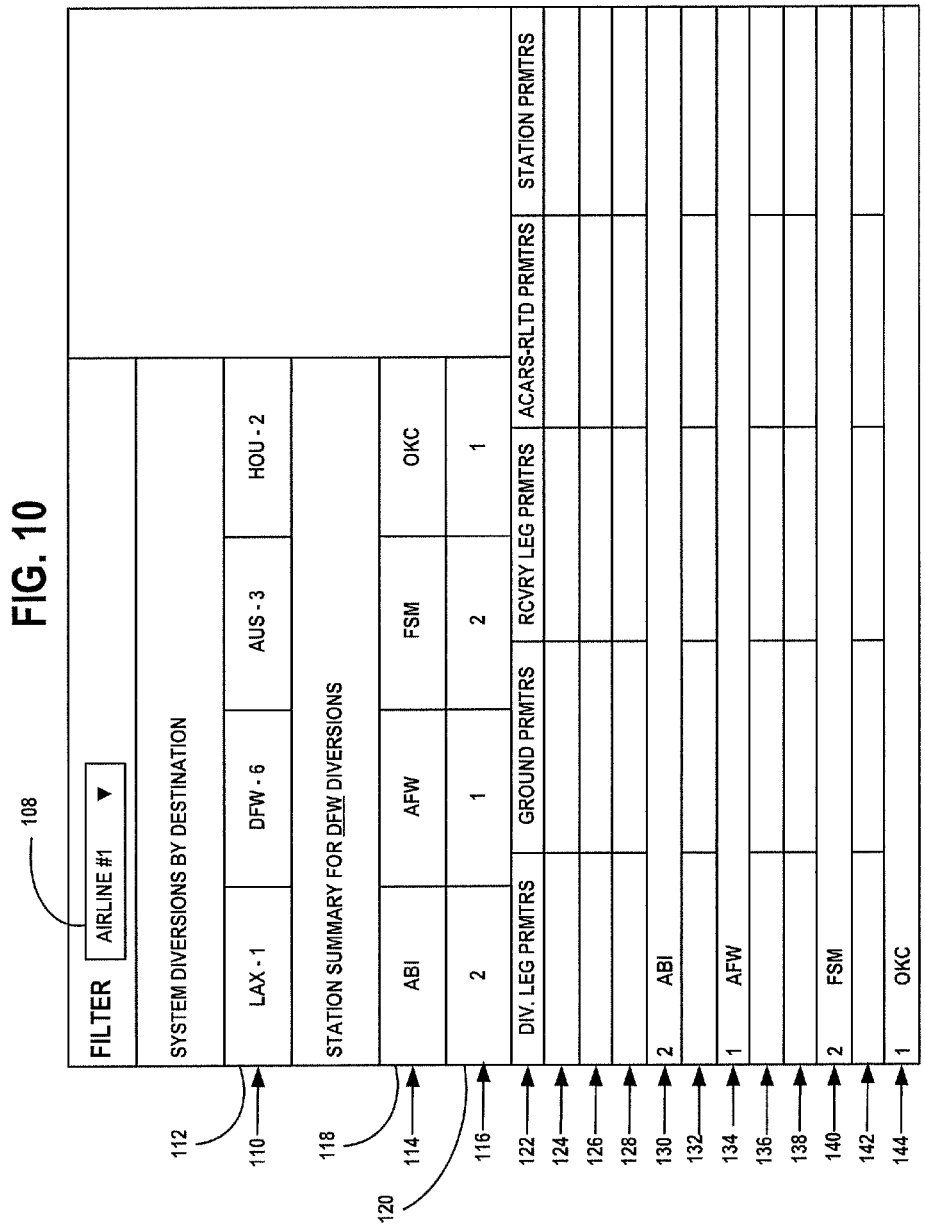

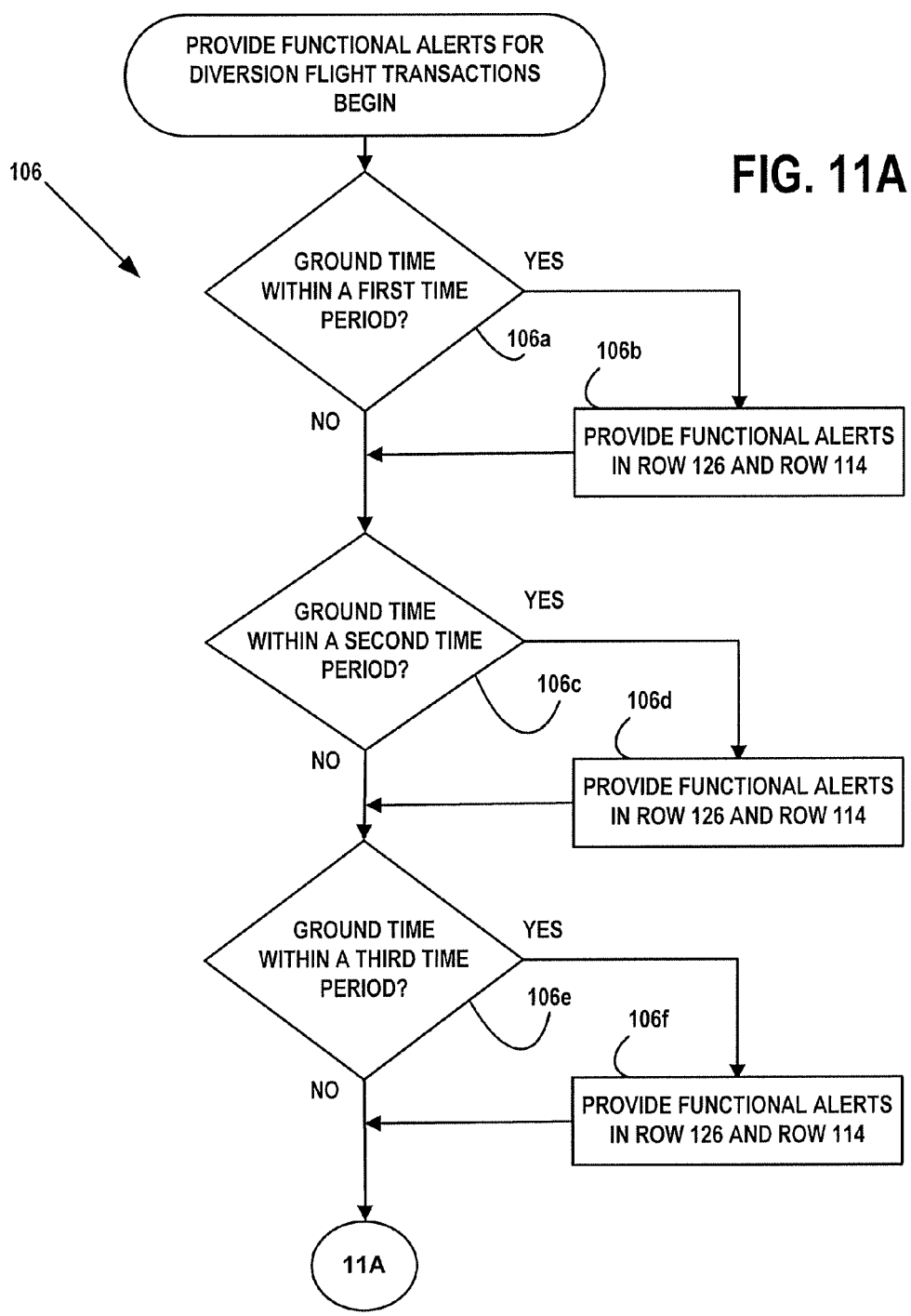

SYSTEM AND METHOD FOR MANAGING TRANSPORTATION TRANSACTIONS

BACKGROUND

The present disclosure relates in general to a system and method for managing transportation transactions such as, for example, air, land and/or sea transportation transactions, and in particular to a system and method for managing one or more diverted transportation transactions such as, for example, one or more diverted airline flights.

BRIEF DESCRIPTION OF THE DRAWINGS

FIG. 7D is a diagrammatic illustration of still yet another portion of the output generated during the step of outputting parameters of the method of FIG. 6, according to an exemplary embodiment.

FIG. 7Da is a table describing the portion of the output illustrated in FIG. 7D, according to an exemplary embodiment.

FIG. 8 is a flow chart illustration of another step of the method of FIG. 6, according to an exemplary embodiment.

FIG. 10 is a diagrammatic illustration of output generated during the method of FIG. 9, according to an exemplary embodiment.

FIGS. 11A and 11B are flow chart illustrations of a step of the method of FIG. 9, according to an exemplary embodiment.

DETAILED DESCRIPTION

Figure 1:
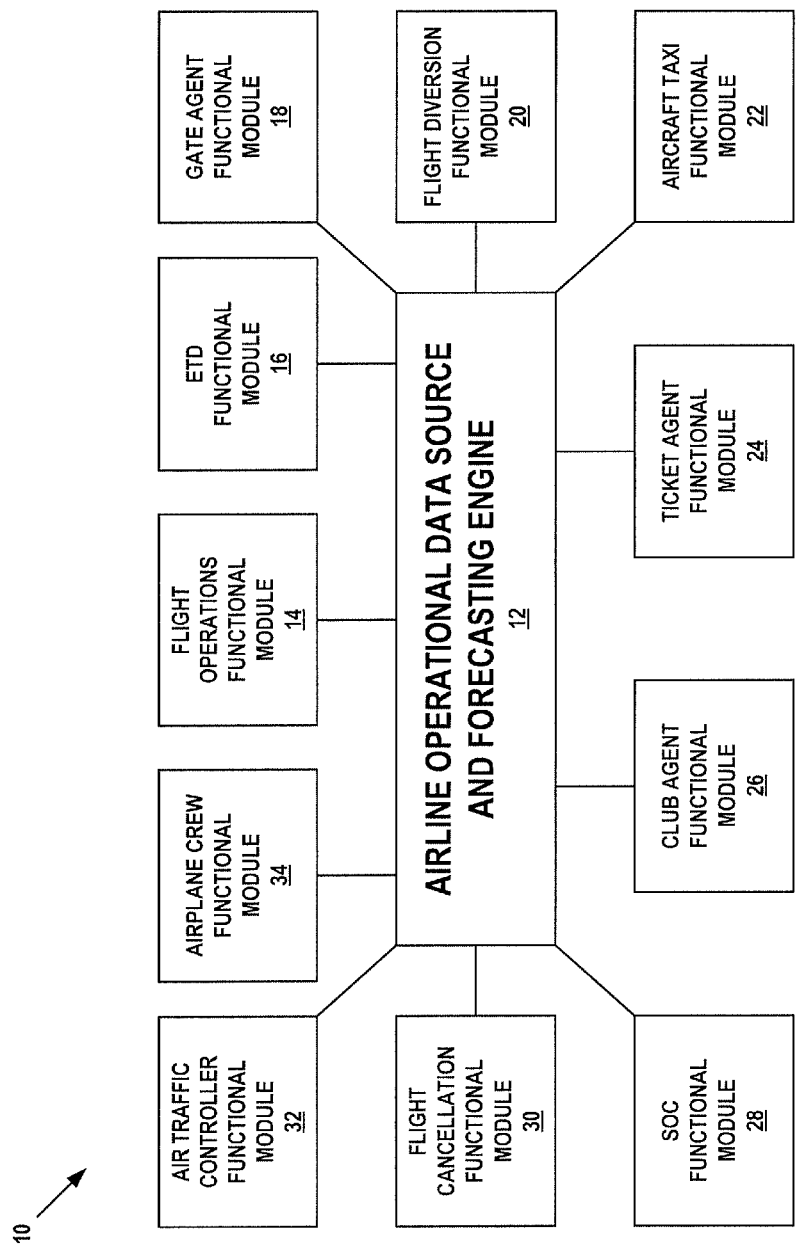
FIG. 1 is a diagrammatic illustration of a system according to an exemplary embodiment, the system including an airline operational data source and forecasting engine, and functional modules operably coupled thereto, the functional modules including a flight diversion functional module.

In an exemplary embodiment, as illustrated in FIG. 1, a system is generally referred to by the reference numeral 10 and includes an airline operational data source and forecasting engine 12. Functional modules are operably coupled to, and in communication with, the engine 12, namely a flight operations functional module 14, an Estimated Time of Departure (ETD) functional module 16, a gate agent functional module 18, a flight diversion functional module 20, an aircraft taxi functional module 22, a ticket agent functional module 24, a club agent functional module 26, a system operations control (SOC) functional module 28, a flight cancellation functional module 30, an air traffic controller functional module 32, and an airplane crew functional module 34.

In several exemplary embodiments, one or more of the functional modules 14, 16, 18, 20, 22, 24, 26, 28, 30, 32 and 34 are in two-way communication with the engine 12. In several exemplary embodiments, one or more of the functional modules 14, 16, 18, 20, 22, 24, 26, 28, 30, 32 and 34 are in one-way communication with the engine 12. In several exemplary embodiments, one or more of the functional modules 14, 16, 18, 20, 22, 24, 26, 28, 30, 32 and 34 are in wireless communication with the engine 12. In several exemplary embodiments, one or more of the functional modules 14, 16, 18, 20, 22, 24, 26, 28, 30, 32 and 34 are operably coupled to, and in communication with, the engine 12 via a network, such as, for example, the Internet, any type of local area network, any type of wide area network, any type of wireless network, any type of voice network, any type of data network, and/or any combination thereof.

In several exemplary embodiments, one or more of the engine 12 and the functional modules 14, 16, 18, 20, 22, 24, 26, 28, 30, 32 and 34 include a computer readable medium or memory having a plurality of instructions stored therein, which instructions are accessible to, and executable by, a processor. In several exemplary embodiments, one or more of the engine 12 and the functional modules 14, 16, 18, 20, 22, 24, 26, 28, 30, 32 and 34 include one or more data structures or databases, which databases are accessible to a processor. In several exemplary embodiments, one or more of the engine 12 and the functional modules 14, 16, 18, 20, 22, 24, 26, 28, 30, 32 and 34 include a processor, a computer readable medium or memory operably coupled to the processor, a plurality of instructions stored in the computer readable medium and accessible to, and executable by, the processor, and one or more data structures or databases stored in the computer readable medium and accessible to the processor.

In an exemplary embodiment, the engine 12 provides data collection and management functionality. The engine 12 collects and stores real-time data from multiple sources and provides integrated data forecasts to the functional modules 14, 16, 18, 20, 22, 24, 26, 28, 30, 32 and 34. In an exemplary embodiment, the data collected by the engine 12 includes latest published flight times and status, latest gate assignments, aircraft rotations, crew sequence information, passenger counts and connections, baggage counts and connections, crew legality information, curfew information, and slot restrictions. Additionally, the engine 12 is capable of generating forecasts of downline impacts as a result of existing delays throughout the system.

In an exemplary embodiment, the engine 12 issues a query for all flight data. In one embodiment, a flight operating system may respond to the query with flight data and crew data in raw form covering the time period 144 hours after the time of the query was made. The flight data includes:
flight number: an identifier for the flight,
destination: the destination for the current flight,
scheduled departure: the time that the aircraft is scheduled to pull back from the gate,
published departure time: the published time that the aircraft is scheduled to pull back from the gate,
target departure: the time that the aircraft is targeted to pull back from the gate (associated with the variable departure calculations associated with the functional module 18),
projected departure: a forecasted departure time based on the propagation forecast,
departure delay: the time that the departure has been delayed,
scheduled arrival: the time that the aircraft is scheduled to pull up to a gate,
published arrival time: the published time that the aircraft is scheduled to pull up to a gate.
projected arrival: a forecasted arrival time based on the propagation forecast,
scheduled block time: number of minutes that reflects the difference between scheduled arrival time and scheduled departure time,
block difference: the difference between the scheduled block time and the flight plan,
missed connections: the number of customers that might miss a connection,
hold connections: the number of minutes a flight needs to be delayed to allow at least one of the missed connection passengers to make a connecting flight,
hold arrive on-time: the number of minutes a flight could be delayed and still arrive on time,
departure gate: the gate from which the aircraft is departing.
arrival gate: the gate at which the aircraft is arriving,
cost index: a numerical value associated with the cost of fuel based on the speed of flying,
downline destination: the destination of the next flight for the aircraft,
downline turn: time that the aircraft is scheduled on the ground at the downline station before the next flight of the aircraft, and
slack: minutes above the planned minimum time of ground time at the down-line station before the next flight of the aircraft.

In an exemplary embodiment, the engine 12 also obtains or accesses passenger data. The passenger data is obtained every four hours and contains real-time booking information covering a 72 hour period. In another embodiment, the passenger data is requested or obtained each time a change occurs on a flight if the flight's load factor exceeds a predetermined threshold. In an exemplary embodiment, the passenger data includes names, club member identification numbers, passenger number record, connecting flight information, and bag information. Further, the engine 12 may obtain ADL files from a governmental organization (e.g., the Federal Aviation Administration), cargo information (such as unit, weight, connection information, and priority), and maintenance information for each aircraft.

In an exemplary embodiment, the flight operations functional module 14 is an integrated station view of flight operations data. The flight operations functional module 14 provides operational information and decision support to tower and operations personnel. The operational information includes departure holds to reduce misconnects, early departures, ETD posting, and identifying gate conflicts. A user interface displays flight information (including departure and arrival times and flight plans), gate information, potential misconnect passengers, same day protection options for misconnect passengers, and incoming connecting passenger information. The module 14 may perform analysis of the integrated data provided to the engine 12 to recommend holding departures.

In an exemplary embodiment, the functional module 16 automatically posts estimated times of departures (ETDs) based on delayed inbound resources (such as aircraft and/or crew). In an exemplary embodiment, the ETD functional module 16 enables each gate at an airport to have its own posting rules. In an exemplary embodiment, the ETD functional module 16 has a user interface that displays gates at airports, allows the creation of groups of gates to allow posting rules to a pre-defined subset of gates, and enables the setting of ETD posting criteria and thresholds.

In an exemplary embodiment, the gate agent functional module 18 provides gate agents with operational information for a specific flight. In an exemplary embodiment, the gate agent functional module 18 has a user interface that displays flight information (including ETD, gate information, flight, and inbound aircraft information, information about inbound connections, downline connections, and inbound crew and aircraft) and information about alternative flights traveling to the destination to which a passenger is headed but unable to make the originally ticketed connecting flight.

In an exemplary embodiment, the aircraft taxi functional module 22 monitors flights system-wide for taxi times that exceed a desired time threshold and provides a user interface that is user-customizable to enable tracking and monitoring of taxi tames. In an exemplary embodiment, the aircraft taxi functional module 22 also generates text message alerts to designated personnel that one or more flights have exceeded certain thresholds for taxi-in or taxi-out. In an exemplary embodiment, the desired time threshold is three hours.

In an exemplary embodiment, the ticket agent functional module 24 provides information to ticket count agents about flights that are experiencing some type of disruption (such as delays, mechanical problems, or crew problems). In an exemplary embodiment, the ticket agent functional module 24 alerts ticket counter agents about possible flight disruptions when processing passengers associated with flights that may have disruptions. In an exemplary embodiment, the ticket agent functional module 24 captures check-in data for passengers and alerts the agent if a flight disruption is expected for that passenger's flight.

In an exemplary embodiment, the club agent functional module 26 provides specialty agents with flight information for designated passengers. In exemplary embodiment, when a designated passenger visits a designated guest area, the designated passenger checks in with the specialty agent. The specialty agent interfaces with the club agent functional module 26 and inputs the designated passenger's passenger information. The club agent functional module 26 tracks and monitors the flights associated with the designated passengers that are within the designated guest area and can provide alerts if flights associated with the designated passengers are disrupted.

In an exemplary embodiment, the SOC functional module 28 alerts system operations control (SOC) about potential flight delays due to late arriving resources (such as crew or aircraft). In an exemplary embodiment, the SOC functional module 28 provides a view of flight operations, projected departure times, passenger connections, and air traffic control data. In an exemplary embodiment, the SOC functional module 28 provides recommended actions to mitigate delays that are detected in the system. In an exemplary embodiment, the SOC functional module 28 has a user interface that displays information about inbound crews, inbound flights, aircraft, and outbound flights, and that receives inputs from a user about the crews, flights, and aircraft.

In an exemplary embodiment, the flight cancellation functional module 30 provides functionality to assist the SOC in determining the flights to cancel during off schedule operations. The flight cancellation functional module 30 analyzes operational constraints while minimizing the disruption to passengers, crews, and aircraft maintenance. In an exemplary embodiment, the flight cancellation functional module 30 has a user interface that displays information about a planned cancellation, including information about crews disrupted, the number of passengers disrupted, the number of passengers disrupted with an alternative connection, information about markets affected by the disruptions, and information about gates affected by the disruptions.

In an exemplary embodiment, the air traffic controller functional module 32 manages slots for air traffic control delay programs. The air traffic controller functional module 32 analyzes and projects delays to detect crew curfew and potential passenger disruption problems. The air traffic controller functional module 32 also redistributes delays to minimize the impact on operations and passengers. In an exemplary embodiment, the air traffic controller functional module 32 has a user interface that displays a summary of the impact that slot management will have on passengers and crew, inbound flight and slot details, outbound flight details, and that receives inputs from a user about modifying air traffic control slots.

In an exemplary embodiment, the airplane crew functional module 34 automates the repair of broken crew pairings and minimizes uncovered flights and standby reserve crews while observing governmental and contractual work rules. In an exemplary embodiment, the crew functional module 34 has a user interface that displays the crew members included in a recovery package, the original sequence of a crew member, and the new sequence for the crew member. In several exemplary embodiments, the crew functional module 34 includes one or more features, aspects, components, and/or systems disclosed in U.S. patent application Ser. No. 11/726,946, filed on Mar. 23, 2007, the disclosure of which is incorporated herein by reference.

The engine 12 is capable of producing three types of forecasting: (i) projected times, (ii) probable times, and (iii) postable times. Projected times are forecasted times based on resource dependencies and takes into account that no actions will be taken to reduce or adjust delays. One of the uses of the projected times forecast is the ability to detect potential problems early (such as legality and curfew issues). Probable times are based on the projected times and take into account that actions will be taken to reduce or adjust delays. One of the uses of the probable times is pre-planning and prioritization. Postable times are based on probable times and take into account variability in the forecast. One of the uses of the postable times is to publish estimated times of departures to passengers.

Figure 2:
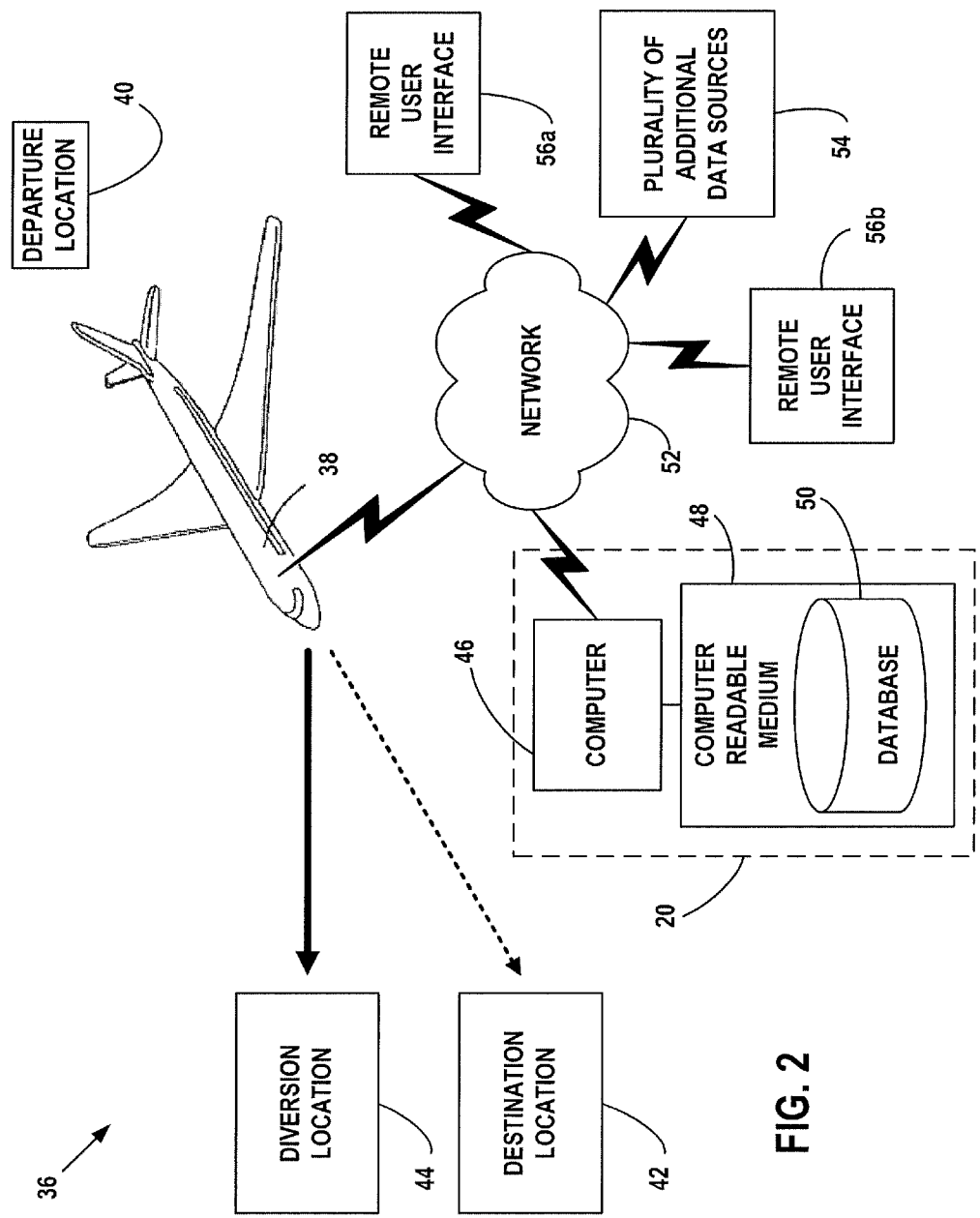
FIG. 2 is a diagrammatic illustration of a system according to an exemplary embodiment, the system including an airplane, a departure location, a destination location, a diversion location, the flight diversion functional module of FIG. 1, a plurality of remote user interfaces, and a plurality of data sources.

In an exemplary embodiment, as illustrated in FIG. 2 with continuing reference to FIG. 1, a system is generally referred to by the reference numeral 36, and depicts a single diversion flight transaction. The system 36 includes an airplane 38, a departure location 40, a destination location 42, and a diversion location 44. The system 36 further includes the flight diversion functional module 20 of the system 10, the module 20 including a computer 46 and a computer readable medium 48 operably coupled thereto. Instructions accessible to, and executable by, the computer 46 are stored in the computer readable medium 48. A database 50 is also stored in the computer readable medium 48. The airplane 38 is operably coupled to, and in two-way communication with, the computer 46 of the module 20 via a network 52; in several exemplary embodiments, the airplane 38 serves as a data source, under conditions to be described below. A plurality of additional data sources 54 are operably coupled to, and in two-way communication with, the computer 46 of the module 20 via the network 52. Remote user interfaces 56a and 56b are operably coupled to, and in two-way communication with, the computer 46 of the module 20 via the network 52.

In an exemplary embodiment, the module 20 is part of the engine 12. In an exemplary embodiment, one or more components of the module 20, including the computer 46, the computer readable medium 48, content stored in the computer readable medium 48, the database 50, content stored in the database 50, and/or any combination thereof, are part of the engine 12. In an exemplary embodiment, the module 20 and/or one or more components thereof are part of, and/or are distributed throughout, the system 10 and/or one or more of the components thereof, including one or more of the engine 12, and the modules 14, 16, 18, 22, 24, 26, 28, 30, 32 and 34. In an exemplary embodiment, the computer readable medium 48 and/or content stored therein are part of, and/or are distributed throughout, the system 10 and/or one or more of the components thereof, including one or more of the engine 12, and the modules 14, 16, 18, 22, 24, 26, 28, 30, 32 and 34. In an exemplary embodiment, the database 50 and/or the contents stored therein are part of, and/or are distributed throughout, the system 10 and/or one or more of the components thereof, including one or more of the engine 12, and the modules 14, 16, 18, 22, 24, 26, 28, 30, 32 and 34.

Figure 3:
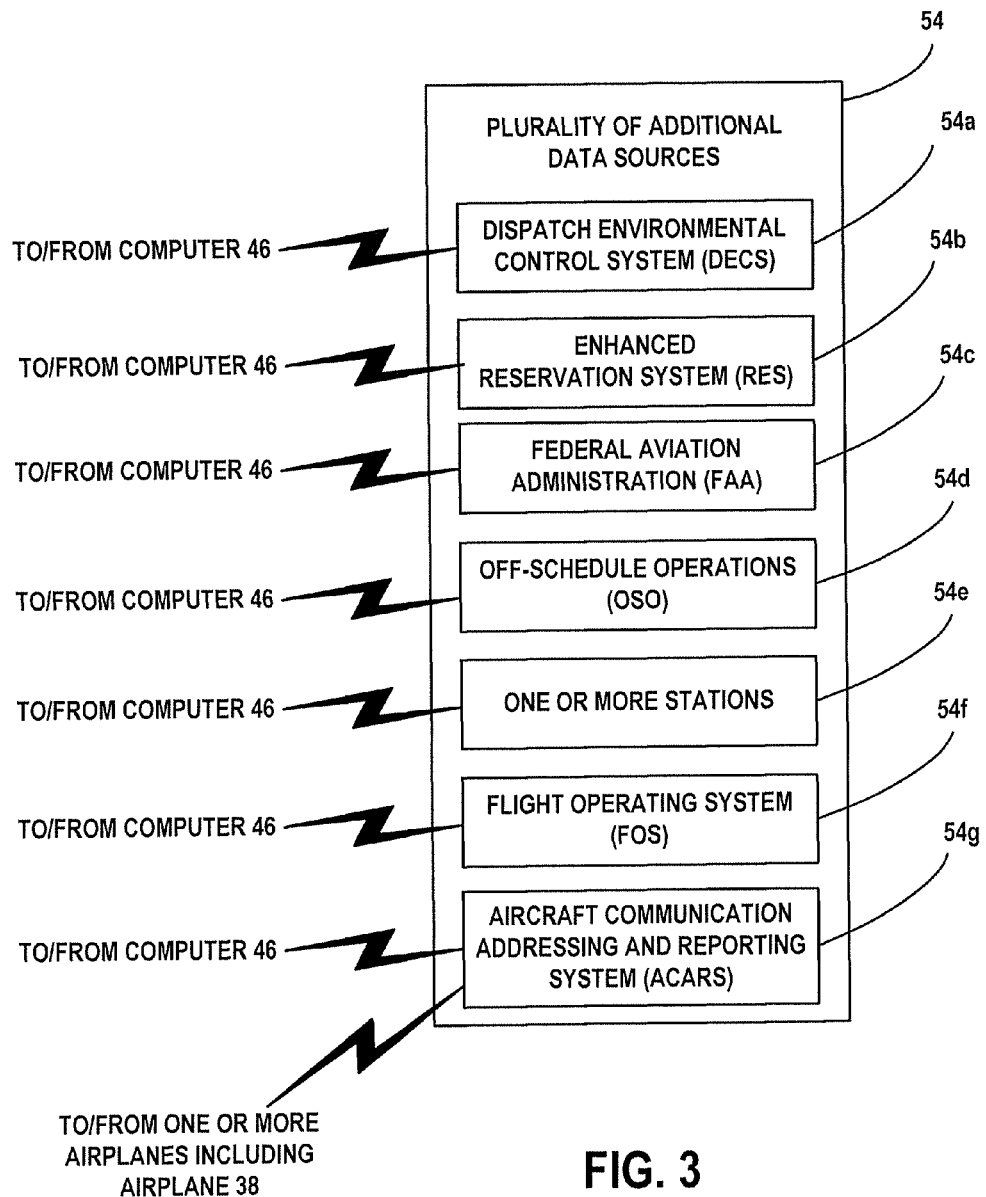
FIG. 3 is a diagrammatic illustration of the plurality of data sources of FIG. 2, according to an exemplary embodiment.

In an exemplary embodiment, as illustrated in FIG. 3 with continuing reference to FIGS. 1-2, the plurality of additional data sources 54 includes a dispatch environmental control system (DECS) 54a and/or one or more computer systems, host-based systems and/or applications thereof, an enhanced reservation system (RES) 54b and/or one or more computer systems, host-based systems and/or applications thereof, the Federal Aviation Administration (FAA) 54c and/or one or more computer systems, host-based systems and/or applications thereof, off-schedule operations (OSO) 54d and/or one or more computer systems, host-based systems and/or applications thereof, one or more stations 54e such as, for example, a station 54e at the departure location 40, a station 54e at the destination location 42, or a station 54e at the diversion location 44, and/or one or more computer systems, host-based systems and/or applications thereof, a flight operating system (FOS) and/or one or more computer systems, host-based systems and/or applications thereof, and an aircraft communication addressing and reporting system (ACARS) 54g and/or one or more computer systems, host-based systems and/or applications thereof. In an exemplary embodiment, the airplane 38 is in two-way communication with the computer 46 of the module 20 via the network 52 and the ACARS 54g.

Figure 4:
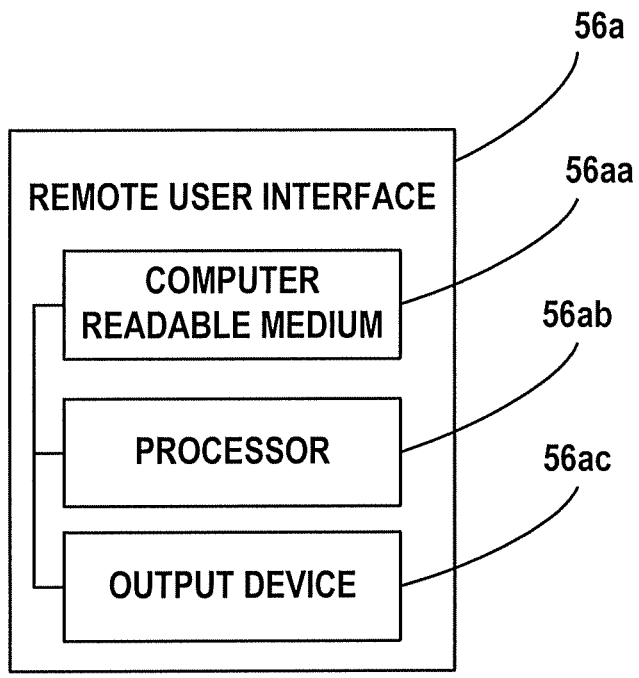
FIG. 4 is a diagrammatic illustration of one of the remote user interfaces of FIG. 2, according to an exemplary embodiment.

In an exemplary embodiment, as illustrated in FIG. 4 with continuing reference to FIGS. 1-3, the remote user interface 56a includes a computer readable medium 56aa, a processor 56ab, and an output device 56ac. In an exemplary embodiment, instructions accessible to, and executable by, the processor 56ab are stored in the computer readable medium 56aa. In an exemplary embodiment, web browser software is stored in the computer readable medium 56aa. In an exemplary embodiment, the output device 56ac includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 56ac includes a graphical display, a printer, a plotter, and/or any combination thereof.

In several exemplary embodiments, the remote user interface 56a is, is at least part of, and/or is located at the same location as, the airplane 38, one or more of the data sources in the plurality of additional data sources 54, the engine 12, the module 20, the computer 46 of the module 20, one or more of the modules 14, 16, 18, 22, 24, 26, 28, 30, 32 and 34, and/or any combination thereof. In several exemplary embodiments, the remote user interface 56a is located remotely from one or more of the airplane 38, one or more of the data sources in the plurality of additional data sources 54, the engine 12, the module 20, the computer 46 of the module 20, one or more of the modules 14, 16, 18, 22, 24, 26, 28, 30, 32 and 34, and/or any combination thereof. In several exemplary embodiments, the remote user interface 56a is a thin client and the computer 46 controls at least a portion of the operation of the remote user interface 56a. In several exemplary embodiments, the remote user interface 56a is a thick client. In several exemplary embodiments, the remote user interface 56a functions as both a thin client and a thick client. In several exemplary embodiments, the remote user interface 56a is, or includes, a telephone, a personal computer, a personal digital assistant, a cellular telephone, other types of telecommunications devices, other types of computing devices, and/or any combination thereof. In several exemplary embodiments, the remote user interface 56a includes a plurality of remote user interfaces. In several exemplary embodiments, the remote user interface 56a is, or at least includes, the module 20. In several exemplary embodiments, the remote user interface 56a is, or at least includes, one or more of the computer 46, the computer readable medium 48, the database 50 and/or any combination thereof.

In an exemplary embodiment, the remote user interface 56b is substantially identical to the remote user interface 56a and therefore will not be described in detail. In several exemplary embodiments, the platforms of the remote user interfaces 56a and 56b are identical. In several exemplary embodiments, the platforms of the remote user interfaces 56a and 56b are different. In several exemplary embodiments, the platforms of the remote user interfaces 56a and 56b vary with respect to equipment, peripherals, hardware architecture and/or specifications, software architecture and/or specifications, and/or any combination thereof.

In several exemplary embodiments, the module 20 and/or one or more components thereof, including one or more of the computer 46, the computer readable medium 48, content stored in the computer readable medium 48, the database 50, content stored in the database 50, and/or any combination thereof, are distributed throughout the system 36 and/or one or more components thereof, the system 10 and/or one or more components thereof, and/or any combination thereof.

Figure 5:
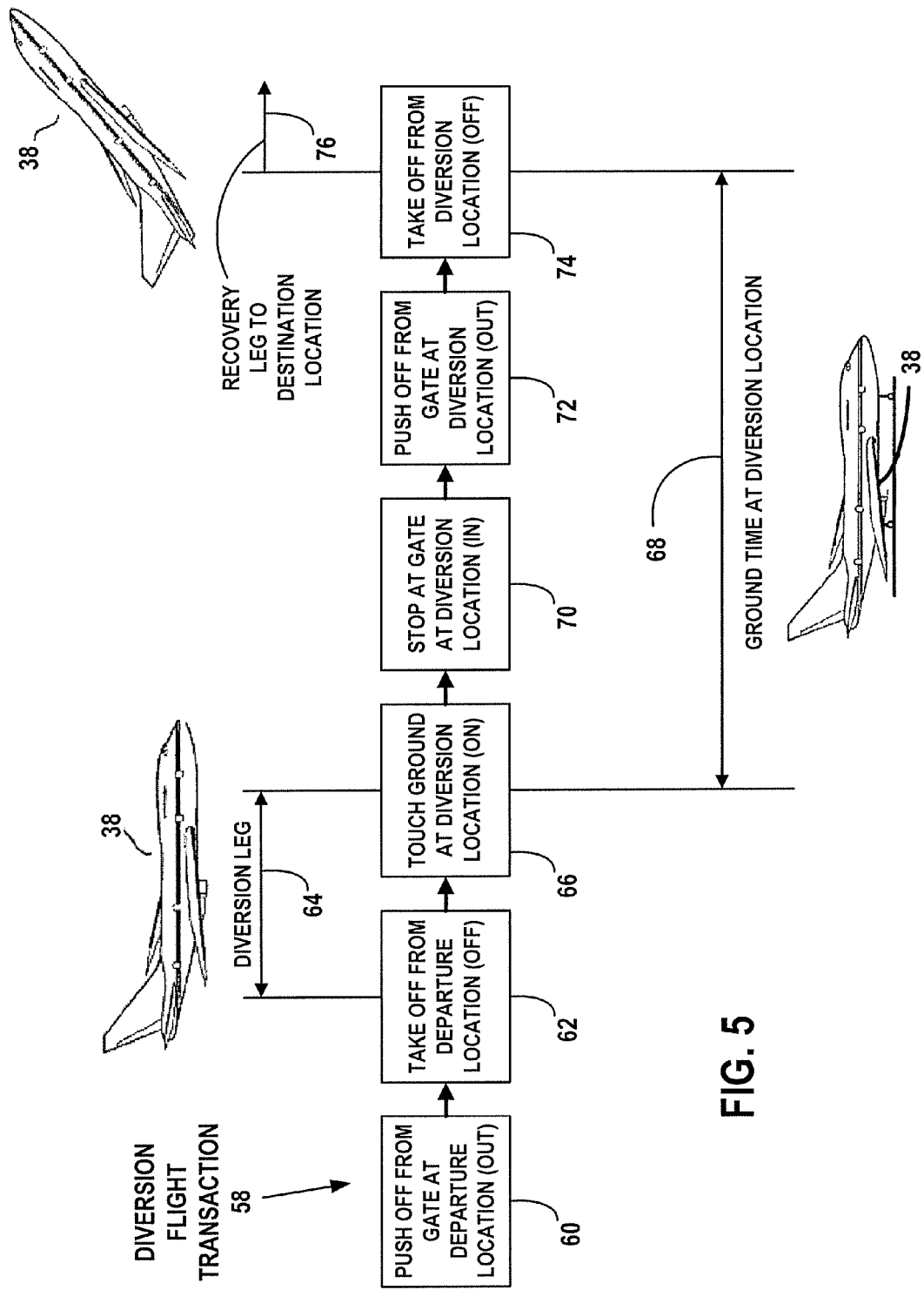
FIG. 5 is a diagrammatic/flow chart illustration of a diversion flight transaction executed during the operation of the system of FIG. 2, according to an exemplary embodiment.

In an exemplary embodiment, as illustrated in FIG. 5 with continuing reference to FIGS. 1-4, a diversion flight transaction 58 is provided, during which transaction the system 36 operates in a manner to be described below. In the transaction 58, the airplane 38 pushes off from a gate at the departure location 40 in step 60, and then departs or takes off from the departure location 40 in step 62. Before, during or after the step 62, the travel route of the airplane 38 is diverted so that the airplane 38 is to travel to the diversion location 44, rather than the destination location 42, thereby initiating a diversion leg 64 of the travel of the airplane 38, during which time the airplane 38 travels to the diversion location 44. The airplane 38 lands or touches ground at the diversion location 44 in step 66, thereby ending the diversion leg 64 and initiating a ground time period 68 of the airplane 38 at the diversion location 44. During the ground time period 68, the airplane 38 stops at a gate at the diversion location 44 in step 70, and pushes off from the gate at the diversion location 44 in step 72. The airplane 38 then departs or takes off from the diversion location 44 in step 74, thereby ending the ground time period 68 and initiating a recovery leg 76 of the travel of the airplane 38, during which time the airplane 38 travels to the destination location 42. In several exemplary embodiments, one or more of the foregoing steps, legs, time periods, and/or any combination thereof, are omitted from the transaction 58. In several exemplary embodiments, one or more steps, legs, time periods, and/or any combination thereof, are added to the transaction 58.

Figure 6:
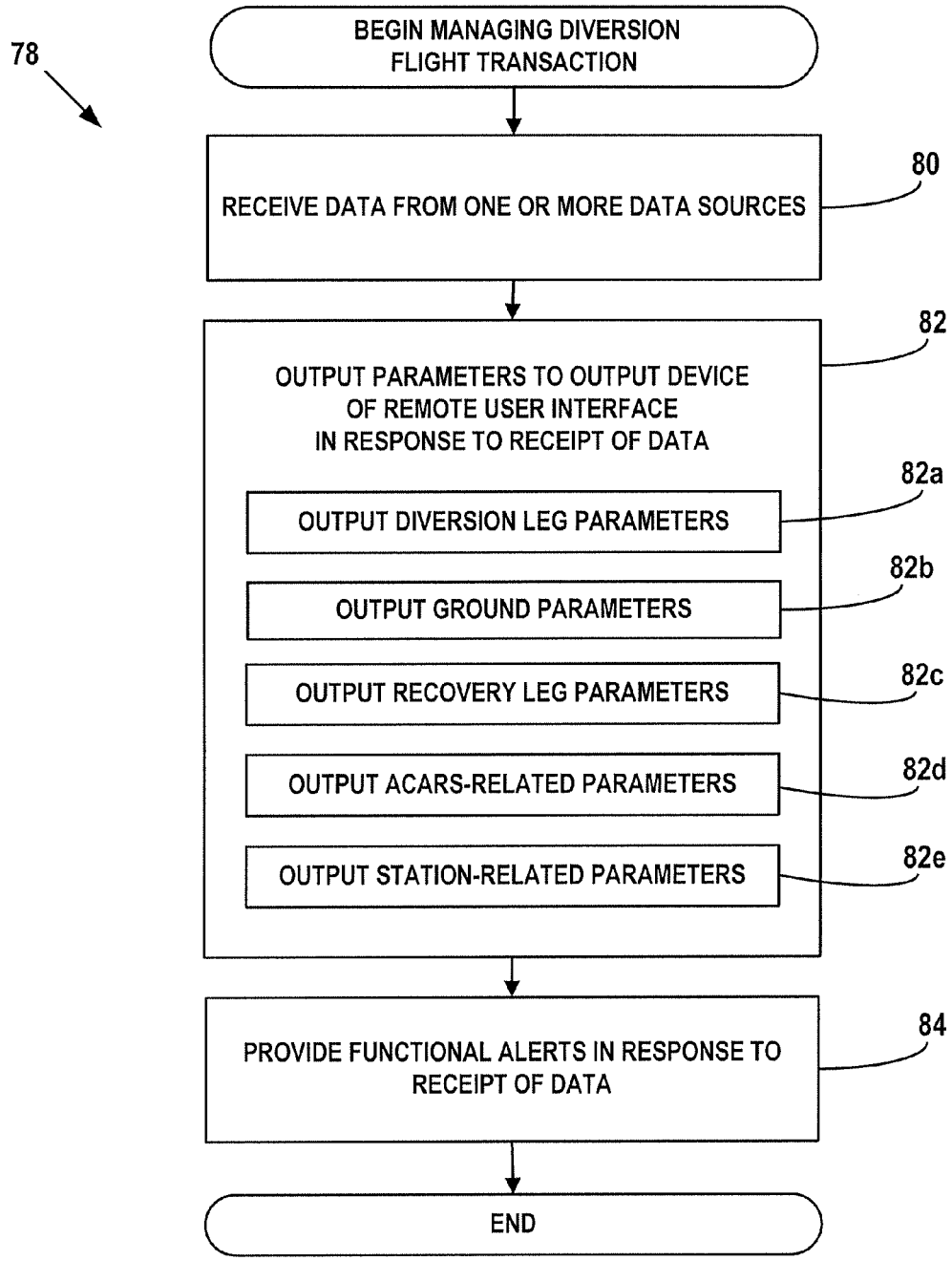
FIG. 6 is a flow chart illustration of a method of managing the diversion flight transaction of FIG. 5, by operating the system of FIG. 2, according to an exemplary embodiment, the method including a step of outputting parameters to an output device.

In an exemplary embodiment, as illustrated in FIG. 6 with continuing reference to FIGS. 1-5, a method of managing the diversion flight transaction 58, by operating the system 36, is generally referred to by the reference numeral 78 and, in several exemplary embodiments, the method 78 is implemented by, or at least partially implemented by, the module 20 of the system 10, the engine 12 of the system 10, and/or any combination thereof. The method 78 includes receiving data from one or more data sources in step 80, outputting parameters in response to the receipt of data in step 82, and providing functional alerts in response to the receipt of data in step 84.

In an exemplary embodiment, to receive data from one or more data sources in the step 80, the computer 46 of the module 20 receives and stores data in the database 50, with the data being received from one or more of the following: the engine 12 of the system 10; one or more of the modules 14, 16, 18, 22, 24, 26, 28, 30, 32 and 34 of the system 10; the airplane 38; one or more of the remote user interfaces 56a and 56b; the DECS 54a; the RES 54b; the FAA 54c; the OSO 54d; the one or more stations 54e such as, for example, the station 54e at the departure location 40, the station 54e at the destination location 42, the station 54e at the diversion location 44, one or more other stations 54e, and/or any combination thereof; the FOS 54f; the ACARS 54g; the remote user interface 56a; and the remote user interface 56b. The types of data received in the step 80 include, but are not limited to, data associated with diversion leg parameters, recovery leg parameters, ACARS-related parameters, and station-related parameters, additional details of which are described below.

In an exemplary embodiment, during the step 80, one or more crew members of the airplane 38 such as, for example, one of the pilots of the airplane 38, manually feeds data to the computer 46 of the module 20 via the ACARS 54g and the network 52. In an exemplary embodiment, during the step 80, one or more personnel at the stations 54e manually feed data to the computer 46 of the module 20 via the network 52 and a user interface, which user interface, in several exemplary embodiments, is substantially similar to, or includes or more components of, the remote user interface 56a.

As shown in FIG. 6, the step 82 includes outputting diversion leg parameters in step 82a, outputting ground parameters in step 82b, outputting recovery leg parameters in step 82c, outputting ACARS-related parameters in step 82d, and outputting station-related parameters in step 82e.

In an exemplary embodiment, to output the parameters in the step 82, a program such as, for example, a web browser, is executed by the processor 56ab of the remote user interface 56a, thereby causing the web browser to access a website hosted by the computer 46 of the module 20, which website provides access to, and graphically communicates, the data stored in the database 50. As a result, in the step 82, the parameters are outputted to the output device 56ac of the remote user interface 56a. In an exemplary embodiment, the output device 56ac includes a graphical display such as a monitor, and the parameters are displayed on the graphical display in the step 82.

In an exemplary embodiment, to output the parameters in the step 82, the remote user interface 56a functions as a graphical terminal or thin client, graphically conveying the results of the processing activities of the computer 46 via the output device 56ac.

In an exemplary embodiment, as illustrated in FIGS. 7A, 7B, 7C, 7D, 7Da, 7E and 7F with continuing reference to FIGS. 1-6, during the step 82, a row 86 of data parameter fields is displayed on the output device 56ac, the row 86 being divided into sections 86a, 86b, 86c, 86d and 86e. A row 88 of data header fields is also displayed on the output device 56ac, with each header field in the row 88 labeling and/or describing the content of a respective data parameter field in the row 86. A row 90 of section header fields is also displayed on the output device 56ac, with each section header field labeling and/or describing a respective section 86a, 86b, 86c, 86d or 86e.

Figure 7A:
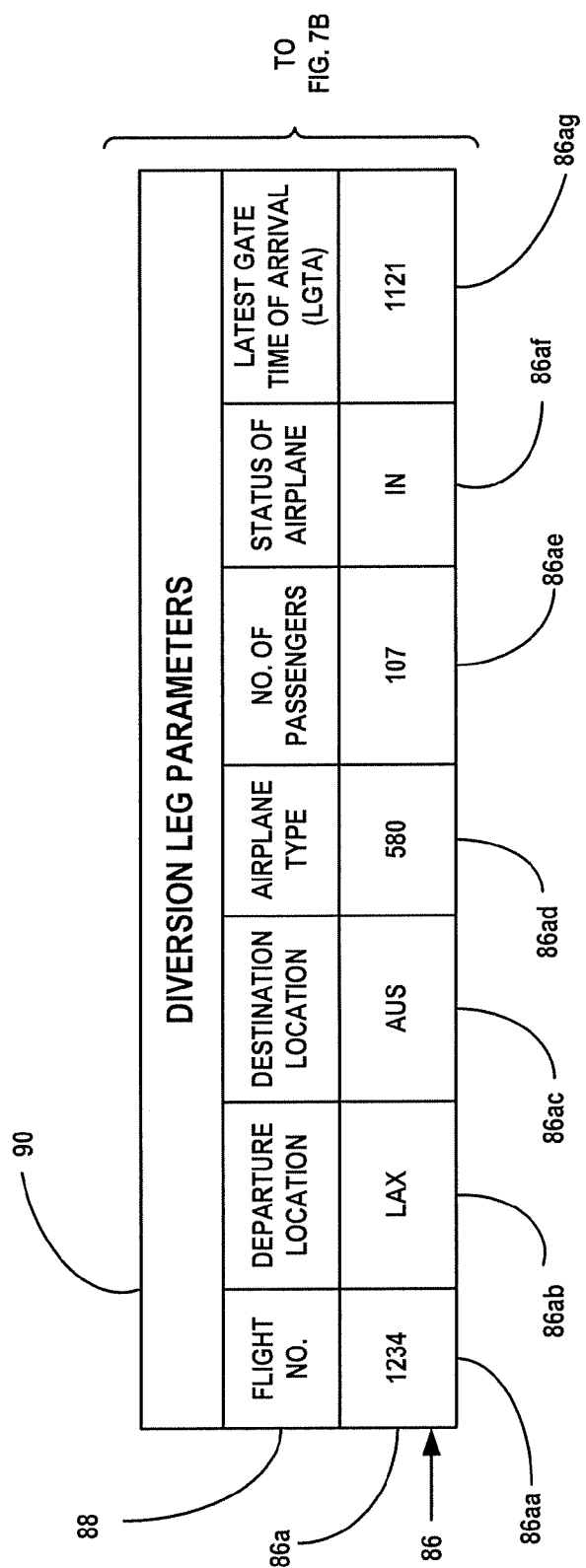
FIG. 7A is a diagrammatic illustration of a portion of an output generated during the step of outputting parameters of the method of FIG. 6, according to an exemplary embodiment.

As shown in FIG. 7A, the section 86a of the row 86 includes one or more data parameter fields associated with the diversion leg 64 of the transaction 58 (shown in FIG. 5). The section 86a of the row 86 includes a flight number data parameter field 86aa, a departure location data parameter field 86ab, a destination location data parameter field 86ac, an airplane type data parameter field 86ad, a number of passengers data parameter field 86ae, a status of airplane data parameter field 86af, and a latest gate time of arrival data parameter field (LGTA) 86ag. The flight number data parameter field 86aa displays the flight number of the airplane 38. The departure location data parameter field 86ab displays a code corresponding to the departure location 40. The destination data parameter field 86ac displays a code corresponding to the destination location 42. The airplane type data parameter field 86ad displays a code corresponding to the airplane type of the airplane 38. The number of passengers data parameter field 86ae displays the number of passengers on the airplane 38 during at least the diversion leg 64. The status of airplane data parameter field 86af displays a code corresponding to the status of the airplane 38, with a code "ETA" indicating that the airplane 38 (via its pilot and/or his or her equivalent) has declared its intent to divert and travel to the diversion location 44 before, during or after the step 62 of the transaction 58, that is, take off from the departure location 40, with a code "ON" indicating that the step 66 of the transaction 58 has been executed, that is, the airplane 38 has touched ground at the diversion location 44, and with a code "IN" indicating that the step 70 of the transaction 58 has been executed, that is, the airplane 38 has stopped at the gate at the diversion location 44. The LTGA data parameter field 86ag displays the latest time at which the step 70 of the transaction 58 was, is being, or will be executed.

Figure 7B:
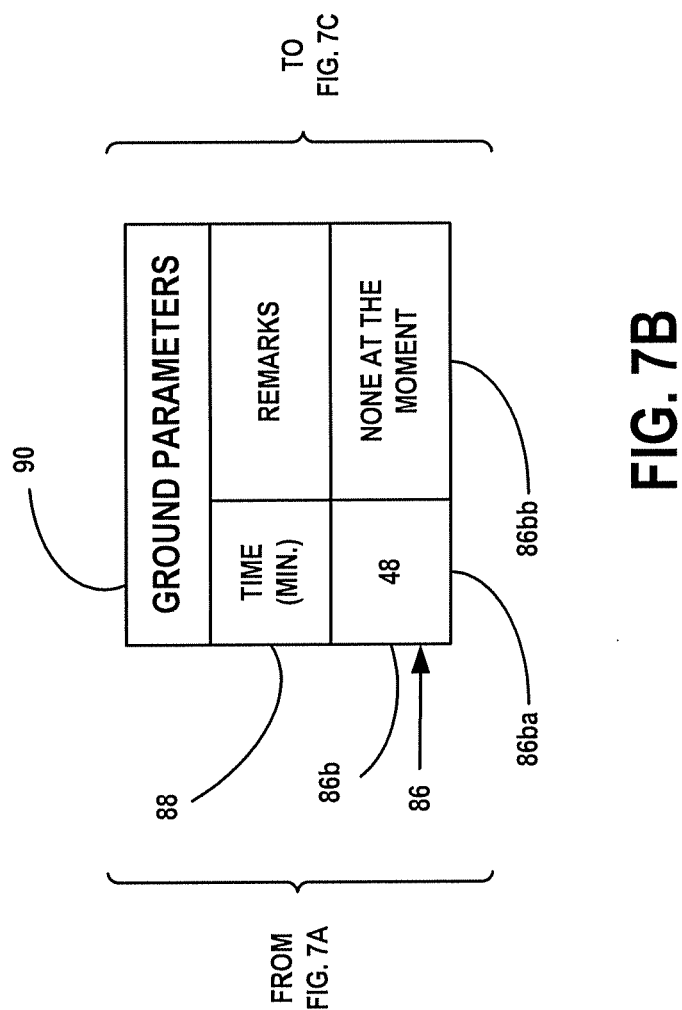
FIG. 7B is a diagrammatic illustration of another portion of the output generated during the step of outputting parameters of the method of FIG. 6, according to an exemplary embodiment.

As shown in FIG. 7B, the section 86b of the row 86 includes one or more data parameter fields associated with the ground time 68 of the method 68 (shown in FIG. 5). The section 86b of the row 86 includes a ground time data parameter field 86ba and a remarks data parameter field 86bb. The ground time data parameter field 86ba displays the ground time 68, that is, the amount of time that the airplane 38 has been, or was, on the ground at the diversion location 44. The remarks data parameter field 86bb displays remarks, if any, regarding the airplane 38, the passengers of the airplane 38, the crew of the airplane 38, the diversion leg 64, the recovery leg 76, and/or any combination thereof.

Figure 7C:
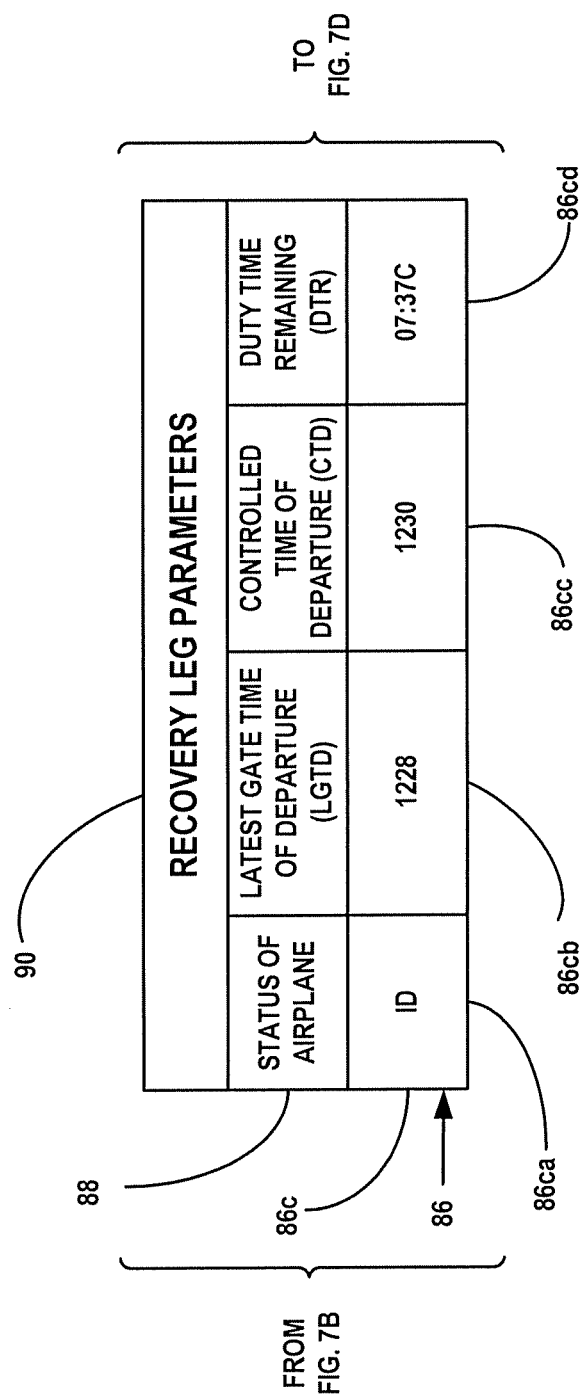
FIG. 7C is a diagrammatic illustration of yet another portion of the output generated during the step of outputting parameters of the method of FIG. 6, according to an exemplary embodiment.

As shown in FIG. 7C, the section 86c of the row 86 includes or more data parameter fields associated with the recovery leg of 76 of the transaction 58 (FIG. 5). The section 86c of the row 86 includes a status of airplane data parameter field 86ca, a latest gate time of departure (LGTD) data parameter field 86cb, a controlled time of departure (CTD) data parameter field 86cc, and a duty time remaining (DTR) data parameter field. The status of airplane data parameter field 86ca displays a code corresponding to the status of the airplane 38, and the LGTD data parameter field 86cb displays the latest time at which the step 72 of the transaction 58 was, is being, or will be executed. The status of airplane data parameter field 86ca and the LGTD data parameter field 86cb display the following code and time combinations, respectively: a code "OUT" in the field 86ca indicates that the step 72 of the transaction 58 has been executed, and the field 86cb correspondingly displays the time at which the airplane 38 pushed back or off from the gate at the diversion location 44; a code "ETD" in the field 86ca indicates that the airplane 38 is at the gate at the diversion location 44, and the field 86cb correspondingly displays the estimated time of departure from the gate; a code "ID" indicates that the airplane 38 has pushed off or out from the gate, but has not taken off, and the field 86cb correspondingly displays the time at which the airplane 38 pushed back or off from the gate at the diversion location 44; and a code "DCN" in the field 86ca indicates that the flight for the recovery leg 76 has been delayed, and the field 86cb correspondingly displays the time at which more information regarding the flight for the recovery leg 76 will be provided. The CTD data parameter field 86cc displays the departure or takeoff time from the diversion location 44, which time, in several exemplary embodiments, is controlled by the FAA 54c. In several exemplary embodiments, the time displayed in the LGTD data parameter field 86*cb* is earlier than the time displayed in the CTD data parameter field 86*cc*. The DTR data parameter field 86*cd* displays the amount of on-duty time remaining for one or more crew members of the airplane 38. In an exemplary embodiment, the DTR data parameter field 86*cd* displays the amount of on-duty time remaining for the crew member of the airplane 38 having the least amount of on-duty time remaining, regardless of whether the crew member is a pilot, flight attendant, or another type of crew member. In an exemplary embodiment, the DTR data parameter field 86*cd* displays the amount of on-duty time remaining for one or more crew members of the airplane 38 upon arrival back at the hub for the airplane 38. In an exemplary embodiment, the DTR data parameter field 86*cd* displays the amount of on-duty time remaining based on the current estimated time of arrival of the recovery leg 76, that is, the amount of additional time that the airplane 38 can be delayed and still be legal to return to its hub.

In an exemplary embodiment, the DTR data parameter field 86*cd* displays either the letter C or the letter F, after the amount of time, thereby indicating whether the amount of time is for one or more members of the cockpit (indicated by the letter C), or for one or more flight attendants (indicated by the letter F).

As shown in FIG. 7D, the section 86*d* of the row 86 includes one or more data parameter fields associated with the ACARS 54*g* (shown in FIG. 3). The section 86*d* of the row 86 includes a location data parameter field 86*da*, a passenger status data parameter field 86*db*, and a departure readiness data parameter field 86*dc*. The location data parameter field 86*da* displays a code that indicates the precise location of the airplane 38 at the diversion location 44, with the code and precise location combinations shown in FIG. 7Da. The passenger status data parameter field 86*db* displays a code that indicates the location of the passengers, with the code and passenger location combinations shown in FIG. 7Da. The departure readiness data parameter field 86*dc* displays a code that indicates the readiness of the airplane 38 for departure from the diversion location 44, with the code and readiness combinations shown in FIG. 7Da.

Figure 7E:
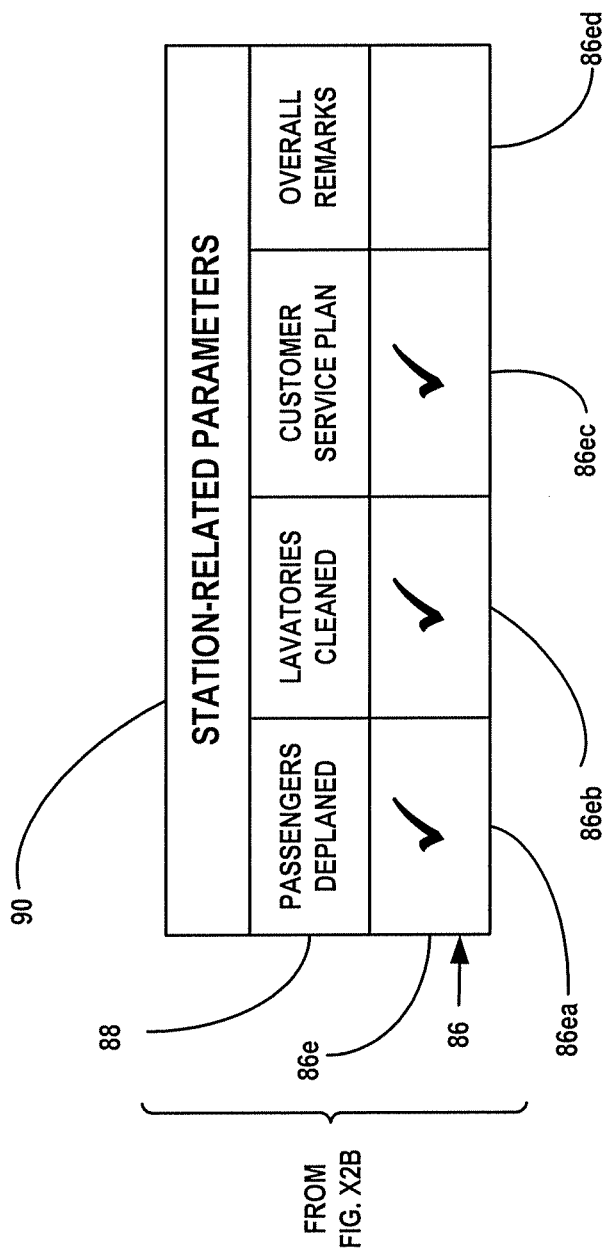
FIG. 7E is a diagrammatic illustration of still yet another portion of the output generated during the step of outputting parameters of the method of FIG. 6, according to an exemplary embodiment.

As shown in FIG. 7E, the section 86*e* of the row 86 includes one or more data parameter fields associated with the station 54*e* at the diversion location 44 (the one or more stations 54*e* are shown in FIG. 3). The section 86*e* includes a passengers deplaned data parameter field 86*ea*, a lavatories cleaned data parameter field 86*eb*, a customer service plan data parameter field 86*ec*, and an overall remarks data parameter field 86*ed*.

The passengers deplaned data parameter field 86*ea* displays a code that indicates whether the passengers on the airplane 38 have deplaned while the airplane 38 is at the gate at the diversion location 44; in an exemplary embodiment, the code is a check mark if the passengers have indeed deplaned, and the code is a blank space if the passengers have not deplaned. In an exemplary embodiment, instead of, or in addition to the foregoing, the passengers deplaned data parameter field 86*ea* displays an icon indicating that remarks associated with deplaning the passengers on the airplane 38 at the diversion location 44 are available to be viewed via the output device 56*ac*; in an exemplary embodiment, these associated remarks are viewed in response to double-clicking or otherwise selecting the icon. In an exemplary embodiment, these associated remarks in the passengers deplaned data parameter field 86*ea* include details regarding how many passengers have deplaned, the time at which the passengers deplaned, etc.

The lavatories cleaned data parameter field 86*eb* displays a code that indicates whether the lavatories on the airplane 38 have been cleaned while the airplane 38 is at the gate at the diversion location 44; in an exemplary embodiment, the code is a check mark if the lavatories have indeed been cleaned, and the code is a blank space if the lavatories have not been cleaned. In an exemplary embodiment, instead of, or in addition to the foregoing, the lavatories cleaned data parameter field 86*ea* displays an icon indicating that remarks associated with cleaning the lavatories on the airplane 38 at the diversion location 44 are available to be viewed via the output device 56*ac*; in an exemplary embodiment, these associated remarks are viewed in response to double-clicking or otherwise selecting the icon.

The customer service plane data parameter field 86*ec* displays a code that indicates whether a customer service plan is in place for one or more passengers on the airplane 38 while the airplane 38 is at the gate at the diversion location 44; in an exemplary embodiment, the code is a check mark if a customer service plane is indeed in place, and the code is a blank space if a customer service plan is not in place. In an exemplary embodiment, instead of, or in addition to the foregoing, the customer service plan data parameter field 86*ed* displays an icon indicating that remarks associated with cleaning the lavatories on the airplane 38 at the diversion location 44 are available to be viewed via the output device 56*ac*; in an exemplary embodiment, these associated remarks are viewed in response to double-clicking or otherwise selecting the icon. In an exemplary embodiment, the associated remarks associated with the icon in the customer service plan data parameter field 86*ed* include one or more of the following: information as to any food and/or beverage catering services that have been, are being, or will be provided to the airplane 38 during the ground time 68; information as to any special services required for one or more of the passengers on the airplane 38; information as to the presence, and number, of unaccompanied minors on the airplane 38; information as to the presence of any diabetics on the airplane 38; information as to whether any of the passengers on the airplane 38 are on oxygen; and information as to any other special services required for the airplane 38 and/or one or more passengers thereon.

The overall remarks data parameter field 86*ed* displays remarks, if any, regarding the deplaning of any passengers from the airplane 38, the lavatories on the airplane 38, any customer service plans for any of the passengers on the airplane 38, the airplane 38, the passengers of the airplane 38, the crew of the airplane 38, the diversion leg 64, the recovery leg 76, and/or any combination thereof.

Figure 7F:
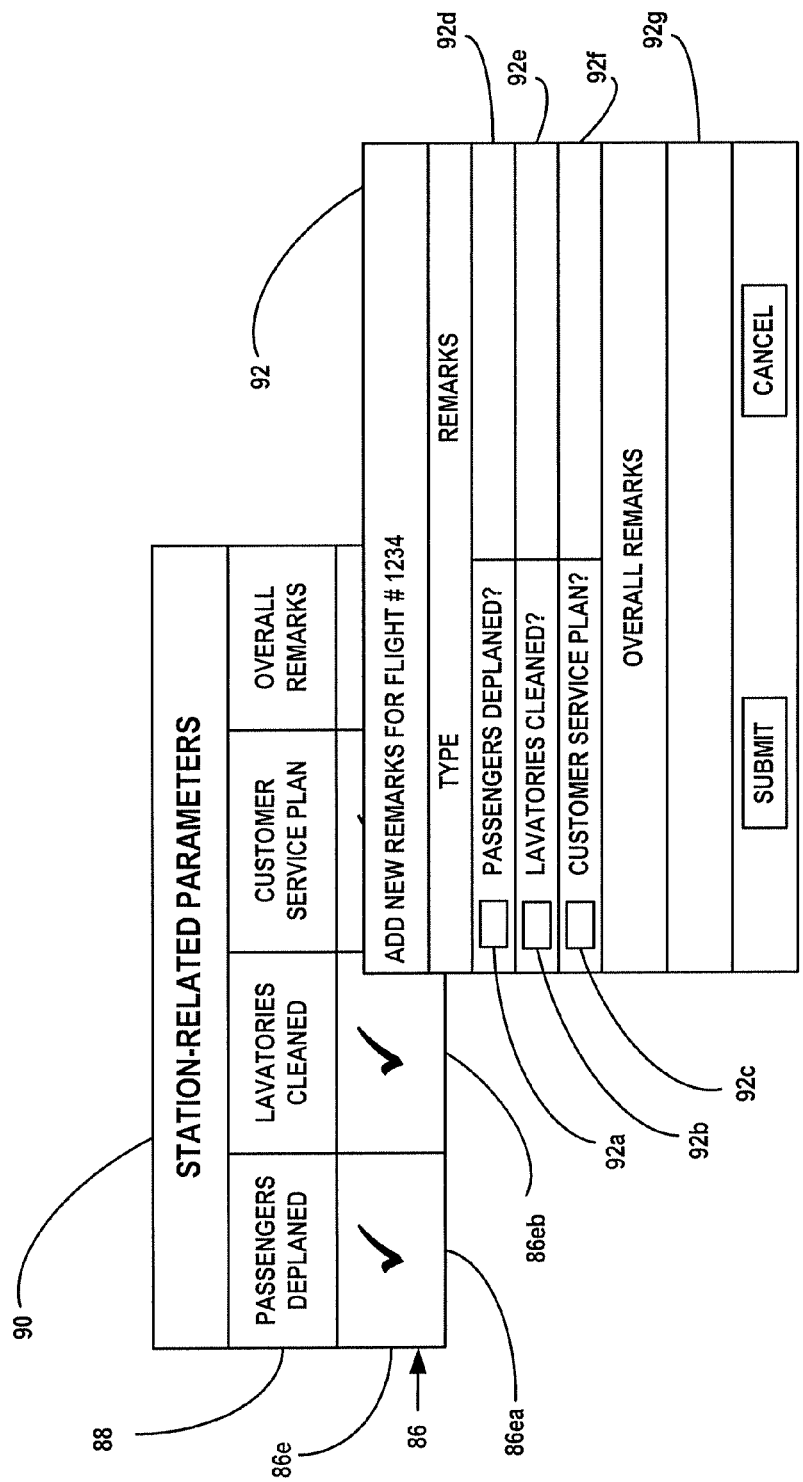
FIG. 7F is a diagrammatic illustration of a dialog box accessible by clicking on or otherwise selecting the portion of the output of FIG. 7E, according to an exemplary embodiment.

As shown in FIG. 7F, the data displayed in each of the fields 86*ea*, 86*eb*, 86*ec* and 86*ed* is received, in the step 80 of the method 78, in response to the input of the data via a dialog box 92. The dialog box 92 is accessed by double clicking on or otherwise selecting any of the fields 86*ea*, 86*eb*, 86*ec* and 86*ed*. The dialog box 92 includes check boxes 92*a*, 92*b*, 92*c*, which correspond to the fields 86*ea*, 86*eb* and 86*ec*, respectively, and further includes remarks boxes 92*d*, 92*e*, 92*f* and 92*g*, which correspond to the fields 86*ea*, 86*eb*, 86*ec* and 86*ed*, respectively. In response to the input of the data via the dialog box 92, the data displayed in each of the fields 86*ea*, 86*eb*, 86*ec* and 86*ed* is immediately updated and thereby corresponds to the data inputted via the dialog box 92. In an exemplary embodiment, in response to the input of the data via the dialog box 92, the data displayed in each of the fields 86*ea*, 86*eb*, 86*ec* and 86*ed* bears a time stamp and/or a date stamp.

In several exemplary embodiment, instead of, or in addition to the sections 86*a*, 86*b*, 86*c*, 86*d* and 86*e*, the row 86 includes other sections of fields. In several exemplary embodiments, one or more of the sections 86a, 86b, 86c, 86d and 86e are positioned in one or more other rows, are independent rows themselves, are arranged in columns or other another graphical arrangement, and/or any combination thereof.

In an exemplary embodiment, as illustrated in FIG. 8 with continuing reference to FIGS. 1-7F, to provide functional alerts in the step 84 of the method 78, it is determined in step 84a whether the ground time in the ground time data parameter field 86ba is within a first predetermined time period such as, for example, greater than or equal to 90 minutes but less than 120 minutes. If so, then the ground time data parameter field 86ba is highlighted in a color in step 84b such as, for example, the color yellow, to thereby more clearly visually distinguish the ground time data parameter field 86ba from the other data parameter fields in the row 86, thereby providing a ground-time functional alert. It is determined in step 84c whether the ground time in the ground time data parameter field 86ba is within a second predetermined time period such as, for example, greater than or equal to 120 minutes but less than 180 minutes. If so, then the ground time data parameter field 86ba is highlighted in a color in step 84d such as, for example, the color orange, to thereby more clearly visually distinguish the ground time data parameter field 86ba from the other data parameter fields in the row 86, thereby providing a ground-time functional alert. It is determined in step 84e whether the ground time in the ground time data parameter field 86ba is within a third predetermined time period such as, for example, greater than or equal to 180 minutes. If so, then the ground time data parameter field 86ba is highlighted in a color in step 84f such as, for example, the color red, to thereby more clearly visually distinguish the ground time data parameter field 86ba from the other data parameter fields in the row 86, thereby providing a ground-time functional alert. It is determined in step 84g whether the amount of on-duty time remaining in the DTR data parameter field 86cd is less than a predetermined amount of time, such as, for example, the amount of flight time required for the recovery leg 76, and/or a government-mandated amount of time. If so, then the DTR data parameter field 86cd is highlighted in a color in step 84h such as, for example, the color red, to thereby more clearly visually distinguish the DTR data parameter field 86cd from the other data parameter fields in the row 86, thereby providing a duty-time-remaining functional alert. In several exemplary embodiments, instead of, or in addition to functional alerts regarding one or more of the data parameter fields 86ba and 86cd, one or more other functional alerts regarding one or more other data parameter fields are provided. In several exemplary embodiments, instead of, or in addition to color highlighting the data parameter fields 86ba and 86cd, the functional alerts are communicated by sounding an alarm, displaying a dialog box having, for example, a written warning message, playing a recording, and/or any combination thereof.

In an exemplary embodiment, during at least a portion of the operation of the system 36, each of the steps 80, 82 and 84 of the method 78 are executed simultaneously. As a result, new and/or updated data is continuously received in the step 80, and the above-described parameters outputted to the output device 56ac in the step 82 are continuously updated, thereby providing a real-time status of each of the steps 60, 62, 66, 70, 72 and 74 of the transaction 58 (FIG. 5), and the diversion leg 64, the ground time 68, and the recovery leg 76 of the transaction 58. In an exemplary embodiment, the parameters outputted to the output device 56ac are continuously stored in the database 50 and, in addition to, or instead of providing a "live" or real-time status, the step 82 includes the option of outputting parameters based on past historical data by outputting the past output parameters stored in the database 50.

In an exemplary embodiment, to execute the method 78 in the manner described above, the module 20 includes a real-time web application that monitors the airplane 38 during each of the steps 60, 62, 66, 70, 72 and 74 of the transaction 58 (FIG. 5), and the diversion leg 64, the ground time 68, and the recovery leg 76 of the transaction 58, with the computer 46 hosting a website that is accessed via the remote user interface 56a, in accordance with the above-described description of the operation of the system 36.

In an exemplary embodiment, the execution of the method 78 provides critical information to assist with the diversion recovery process of the airplane 38, that is, diverting the airplane 38 and then ensuring that the airplane 38 arrives at the destination location 42. In an exemplary embodiment, the alert functionality in the step 84 of the method 78 permits an immediate indication of an excessive ground time for the airplane 38 during the ground time 68.

In several exemplary embodiments, as a result of the execution of the above-described method 78, multiple pieces of information or data (e.g., aircraft, crew, passenger, and/or FAA-related data) are consolidated from multiple sources (e.g., the DECS 54a, the RES 54b, the FAA 54c, the ACARS 54g, the one or more stations 54e, etc.) and displayed in a unified framework (e.g., the display of the rows 86, 88 and 90 on the output device 56ac) for multiple types of users (e.g., dispatchers, airline diversion coordinators, hub managers, spoke stations, station managers, airline management, etc.) for multiple purposes (e.g., diversion station loading, customer service tracking, diversion recovery management, etc.).

In an exemplary embodiment, the method 78 provides real-time updating of parameters associated with the airplane 38 during the subjection of the airplane 38 to the transaction 58. In an exemplary embodiment, the method 78, inter alia, monitors the amount of time that passengers spend in the airplane 38 while the airplane 38 is, for example, on the ground at the diversion location 44, thereby enabling the management of "sit" times.

In an exemplary embodiment, the method 78 facilitates better customer service on the part of the airline during challenging diversion scenarios. In an exemplary embodiment, the use of the remote user interface 56a in the manner described above facilitates common situational awareness to key decision-makers and stakeholders during diversion scenarios.

In an exemplary embodiment, the method 78 supports the planning, tracking and recovery of diversion flight transactions.

In several exemplary embodiments, instead of, or in addition to the remote user interface 56a, the remote user interface 56b is used to implement one or more of the steps of the method 78 in a manner substantially similar to the above-described manner by which the remote user interface 56a is used to implement one or more of the steps of the method 78. In several exemplary embodiments, instead of, or in addition to the remote user interfaces 56a and/or 56b, one or more other remote user interfaces are used to implement one or more of the steps of the method 78 in a manner substantially similar to the above-described manner by which the remote user interface 56a is used to implement one or more of the steps of the method 78.

Figure 9:
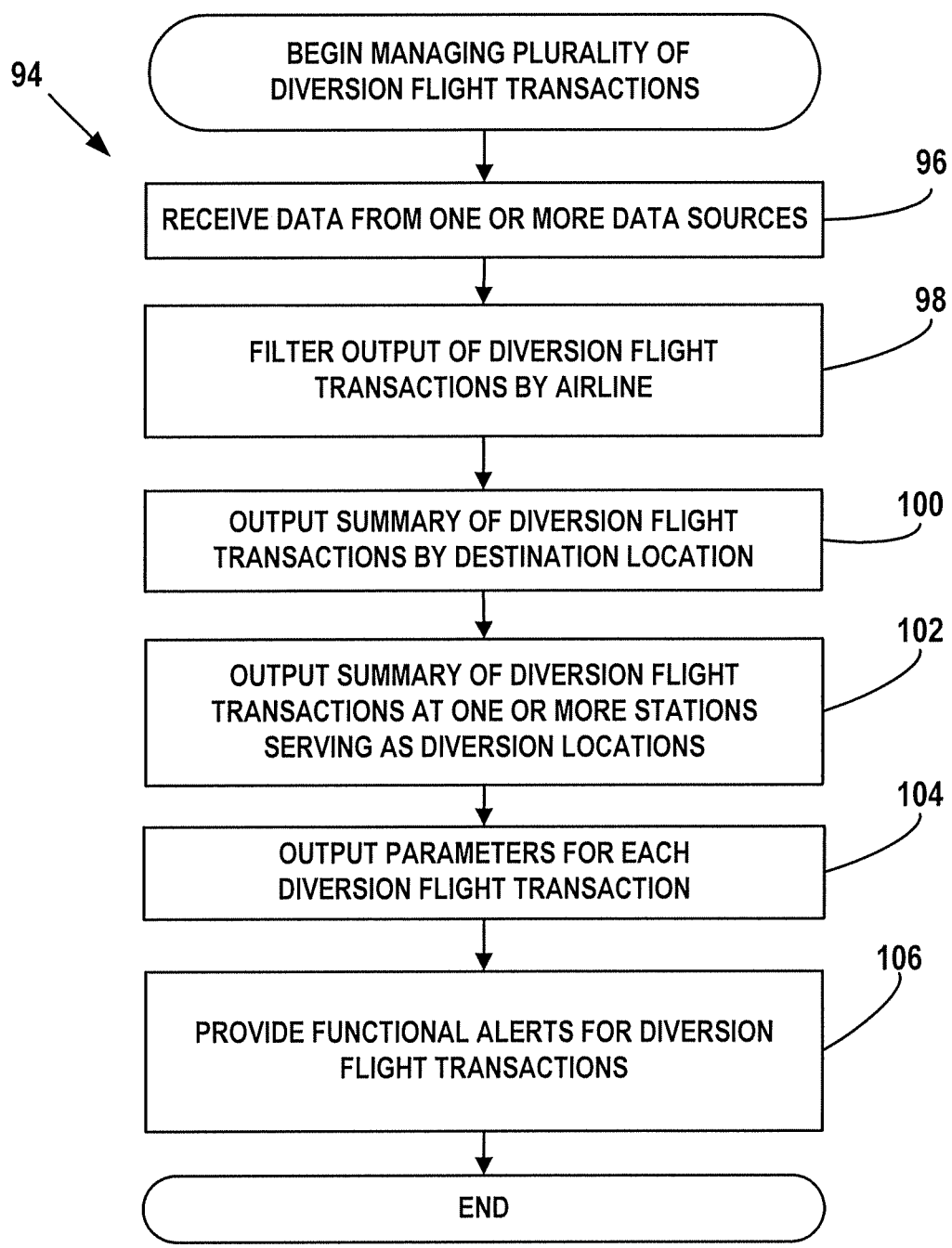
FIG. 9 is a flow chart illustration of a method of managing a plurality of diversion flight transactions, according to an exemplary embodiment, each of the diversion flight transactions being substantially similar to the diversion flight transaction of FIG. 5.

In an exemplary embodiment, as illustrated in FIG. 9 with continuing reference to FIGS. 1-8, a method of managing a plurality of diversion flight transactions is generally referred to by the reference numeral 94, with each of the diversion flight transactions in the plurality of diversion flight transactions being substantially similar to the diversion flight transaction 58 shown in FIG. 5. The execution of the method 94 includes the operation of one or more of the components of the above-described system 36, as will be described in further detail below. In several exemplary embodiments, the method 94 is implemented by, or at least partially implemented by, the module 20 of the system 10, the engine 12 of the system 10, and/or any combination thereof. The method 94 includes receiving data from one or more data sources in step 96, filtering output associated with diversion flight transactions by airline in step 98, outputting a summary of diversion flight transactions by destination location in step 100, outputting a summary of diversion flight transactions at one or more stations serving as diversion locations in step 102, outputting parameters for each diversion flight transaction in step 104, and providing functional alerts for diversion flight transactions in step 106.

In an exemplary embodiment, the step 96 of the method 94 is substantially similar to the step 80 of the method 78, except that, in the step 96, the received data is associated with a plurality of diversion flight transactions and thus a plurality of planes, instead of, or in addition to the diversion flight transaction 58 and thus the airplane 38, rather than just receiving data associated with the diversion flight transaction 58 and thus the airplane 38.

In an exemplary embodiment, to receive data from one or more data sources in the step 96, the computer 46 of the module 20 receives and stores data in the database 50, with the data being received from one or more of the following: the engine 12 of the system 10; one or more of the modules 14, 16, 18, 22, 24, 26, 28, 30, 32 and 34 of the system 10; the airplane 38; one or more other airplanes in addition to the airplane 38; one or more of the remote user interfaces 56a and 56b; the DECS 54a; the RES 54b; the FAA 54c; the OSO 54d; the one or more stations 54e such as, for example, the stations 54e at the departure location 40 and one or more other departure locations in addition the departure location 40, the stations 54e at the destination location 42 and one or more other destination locations in addition to the destination location 42, the stations 54e at the diversion location 44 and one or more other diversion locations in addition to the diversion location 44, one or more other stations 54e, and/or any combination thereof; the FOS 54f; the ACARS 54g; the remote user interface 56a; and the remote user interface 56b. The types of data received in the step 80 include various types of data associated with a plurality of airplanes that have undergone, are undergoing, or will undergo, respective diversion flight transactions substantially similar to the diversion flight transaction 58, including, but not limited to, data associated with diversion leg parameters, recovery leg parameters, ACARS-related parameters, and station-related parameters.

In an exemplary embodiment, during the step 96, one or more crew members of one or more airplanes such as, for example, one of the pilots of the airplane 38, manually feeds data to the computer 46 of the module 20 via the ACARS 54g and the network 52. In an exemplary embodiment, during the step 80, one or more personnel at the stations 54e manually feed data to the computer 46 of the module 20 via the network 52 and a user interface, which user interface, in several exemplary embodiments, is substantially similar to, or includes or more components of, the remote user interface 56a.

In an exemplary embodiment, to filter output in the step 98 of the method 94, to output the respective summaries in the steps 100 and 102 of the method 94, and to output parameters in the step 104 of the method 94, a program stored in the computer readable medium 56ac of the remote user interface 56a, such as, for example, a web browser, is executed by the processor 56ab of the remote user interface 56a, thereby causing the web browser to access a website hosted by the computer 46 of the module 20, which website provides access to, and graphically communicates, the data stored in the database 50. As a result, in the steps 100, 102 and 104, output is delivered to the output device 56ac of the remote user interface 56a. In an exemplary embodiment, the output device 56ac includes a graphical display such as a monitor, and the output is displayed on the graphical display in the steps 100, 102 and 104.

In an exemplary embodiment, to filter output in the step 98 of the method 94, to output the respective summaries in the steps 100 and 102 of the method 94, and to output parameters in the step 104 of the method 94, the remote user interface 56a functions as a graphical terminal or thin client, graphically conveying the results of the processing activities of the computer 46 via the output device 56ac.

In an exemplary embodiment, as illustrated in FIG. 10 with continuing reference to FIGS. 1-9, to filter output in the step 98 of the method 94, a drop-down box 108 is displayed on the output device 56ac. The drop-down box 108 permits the selection in the step 98 of one airline, a specific combination of airlines, or all airlines, for which associated data is received in the step 96; this selection via the drop-down box 108 filters the respective summaries and parameters outputted in the steps 100, 102 and 104 to only the summaries and parameters associated with selected airline or airlines.

In an exemplary embodiment, as illustrated in FIG. 10 with continuing reference to FIGS. 1-9, to output the summary of diversion flight transactions by destination location in the step 100 of the method 94, a row 110 is displayed on the output device 56ac. The row 110 includes a plurality of fields 112, with each of the fields 112 displaying an airport code indicating an airport, and a number indicating the number of diversion flight transactions for which the airport is the destination location.

In an exemplary embodiment, as illustrated in FIG. 10 with continuing reference to FIGS. 1-9, to output a summary of diversion flight transactions at one or more stations serving as diversion locations in the step 102 of the method 94, rows 114 and 116 are displayed on the output device 56ac. The row 114 includes a plurality of fields 118, with each of the fields 118 displaying an airport code indicating an airport that is one of the diversion locations corresponding to one of the destination locations indicated in the row 110. That is, the airports indicated in the row 114 are the respective diversion locations for the diversion flight transactions having the same destination location. For example, as shown in FIG. 10, one of the destination locations indicated in the row 110 is DFW, and the airports indicated in the row 114 are the respective diversion locations for diversion flight transactions for which DFW is the destination location. In an exemplary embodiment, the diversion locations indicated in the row 114 for a particular destination location are selected by clicking on or otherwise selecting the corresponding field 112 in the row 110 indicating the particular destination location. In an exemplary embodiment, additional rows of diversion locations for additional destination locations are also displayed on the output device 56ac in response to clicking on or otherwise selecting additional fields 112. In an exemplary embodiment, the execution of the step 102 results in the display on the output device 56ac of the distribution of the diversion flight transactions for a selected destination location.

As shown in FIG. 10, the row 116 includes a plurality of fields 120, with each of the fields 120 positioned immediately below a respective one of the fields 118 and displaying a number indicating the number of diversion flight transactions for which the airport indicated in the respective one of the fields 118 is the diversion location. For example, as shown in FIG. 10, the field 112 displaying the term "DFW—6" indicates that there are six (6) diversion locations for the destination location of DFW, and therefore the total number of diversion flight transactions in the row 116, that is, the total of the numbers displayed in the fields 120, also equals six (6).

In an exemplary embodiment, as illustrated in FIG. 10 with continuing reference to FIGS. 1-9, to output parameters for each diversion flight transaction in the step 104 of the method 94, rows 122 and 124 are displayed on the output device 56ac. The rows 122 and 124 include header fields and are substantially identical to the rows 90 and 88, respectively (shown in FIGS. 7A-7E), and therefore the rows 122 and 124 will not be described in detail.

Rows 126 and 128 are displayed on the output device 56ac, with each of the rows 126 and 128 including data parameter fields specific to a diversion flight transaction; the respective diversion flight transactions for which data parameter fields are included in the rows 126 and 128 have the same diversion location. Each of the rows 126 and 128 is substantially identical to the row 86 (shown in FIGS. 7A-7E), except that the data displayed in each of the rows 126 and 128 is associated with a different diversion flight transaction. Since each of the rows 126 and 128 is substantially identical to the row 86, the rows 126 and 128 will not be described in further detail. A row 130 is displayed on the output device 156ac, and includes a data parameter field indicating the diversion location for the specific diversion flight transactions associated with the rows 126 and 128, and a data parameter field indicating the total number of diversion flight transactions having that same diversion location, which number is equal to the number in the field 120 immediately below the field 118 indicating that same diversion location. For example, one of the fields 118 in the row 114 indicates ABI as a diversion location, and the field 120 immediately below this field 118 displays the number two (2), indicating that there is a total number of two (2) diversion flight transactions having the diversion location of ABI; the data parameter fields in the row 130 are therefore consistent with the foregoing by indicating that there is a total number of two (2) diversion flight transactions having the diversion location of ABI.

A row 132 is displayed on the output device 56ac and includes data parameter fields specific to a diversion flight transaction. The row 132 is substantially similar to the row 86 (shown in FIGS. 7A-7E), except that the data displayed in the row 132 is specific to a different diversion flight transaction. Since the now 132 is substantially identical to the row 86, the row 132 will not be described in further detail. A row 134 is displayed on the output device 156ac, and includes a data parameter field indicating the diversion location for the specific diversion flight transaction associated with the now 132, and a data parameter field indicating the total number of diversion flight transactions having that same diversion location, which number is equal to the number in the field 120 immediately below the field 118 indicating that same diversion location. For example, one of the fields 118 in the row 114 indicates AFW as a diversion location, and the field 120 immediately below this field 118 displays the number one (1), indicating that there is a total number of one (1) diversion flight transaction having the diversion location of AFW; the data parameter fields in the row 134 are therefore consistent with the foregoing by indicating that there is a total number of one (1) diversion flight transaction having the diversion location of AFW.

Rows 136 and 138 are displayed on the output device 56ac, with each of the rows 136 and 138 including data parameter fields specific to a diversion flight transaction; the respective diversion flight transactions for which data parameter fields are included in the rows 136 and 138 have the same diversion location. Each of the rows 136 and 138 is substantially identical to the row 86 (shown in FIGS. 7A-7E), except that the data displayed in each of the rows 136 and 138 is associated with a different diversion flight transaction. Since each of the rows 136 and 138 is substantially identical to the row 86, the rows 136 and 138 will not be described in further detail. A row 140 is displayed on the output device 156ac, and includes a data parameter field indicating the diversion location for the specific diversion flight transactions associated with the rows 136 and 138, and a data parameter field indicating the total number of diversion flight transactions having that same diversion location, which number is equal to the number in the field 120 immediately below the field 118 indicating that same diversion location. For example, one of the fields 118 in the row 114 indicates FSM as a diversion location, and the field 120 immediately below this field 118 displays the number two (2), indicating that there is a total number of two (2) diversion flight transactions having the diversion location of FSM; the data parameter fields in the row 140 are therefore consistent with the foregoing by indicating that there is a total number of two (2) diversion flight transactions having the diversion location of FSM.

A row 142 is displayed on the output device 56ac and includes data parameter fields specific to a diversion flight transaction. The row 142 is substantially similar to the row 86 (shown in FIGS. 7A-7E), except that the data displayed in the row 142 is specific to a different diversion flight transaction. Since the row 142 is substantially identical to the row 86, the row 142 will not be described in further detail. A row 144 is displayed on the output device 156ac, and includes a data parameter field indicating the diversion location for the specific diversion flight transaction associated with the row 142, and a data parameter field indicating the total number of diversion flight transactions having that same diversion location, which number is equal to the number in the field 120 immediately below the field 118 indicating that same diversion location. For example, one of the fields 118 in the row 114 indicates OKC as a diversion location, and the field 120 immediately below this field 118 displays the number one (1), indicating that there is a total number of one (1) diversion flight transaction having the diversion location of OKC; the data parameter fields in the row 144 are therefore consistent with the foregoing by indicating that there is a total number of one (1) diversion flight transaction having the diversion location of OKC.

In an exemplary embodiment, the execution of the step 104 results in the display on the output device 56ac of information for each diversion flight transaction grouped by diversion location (e.g., ABI, AFW, FSM, OKC, etc.).

Figure 11B:
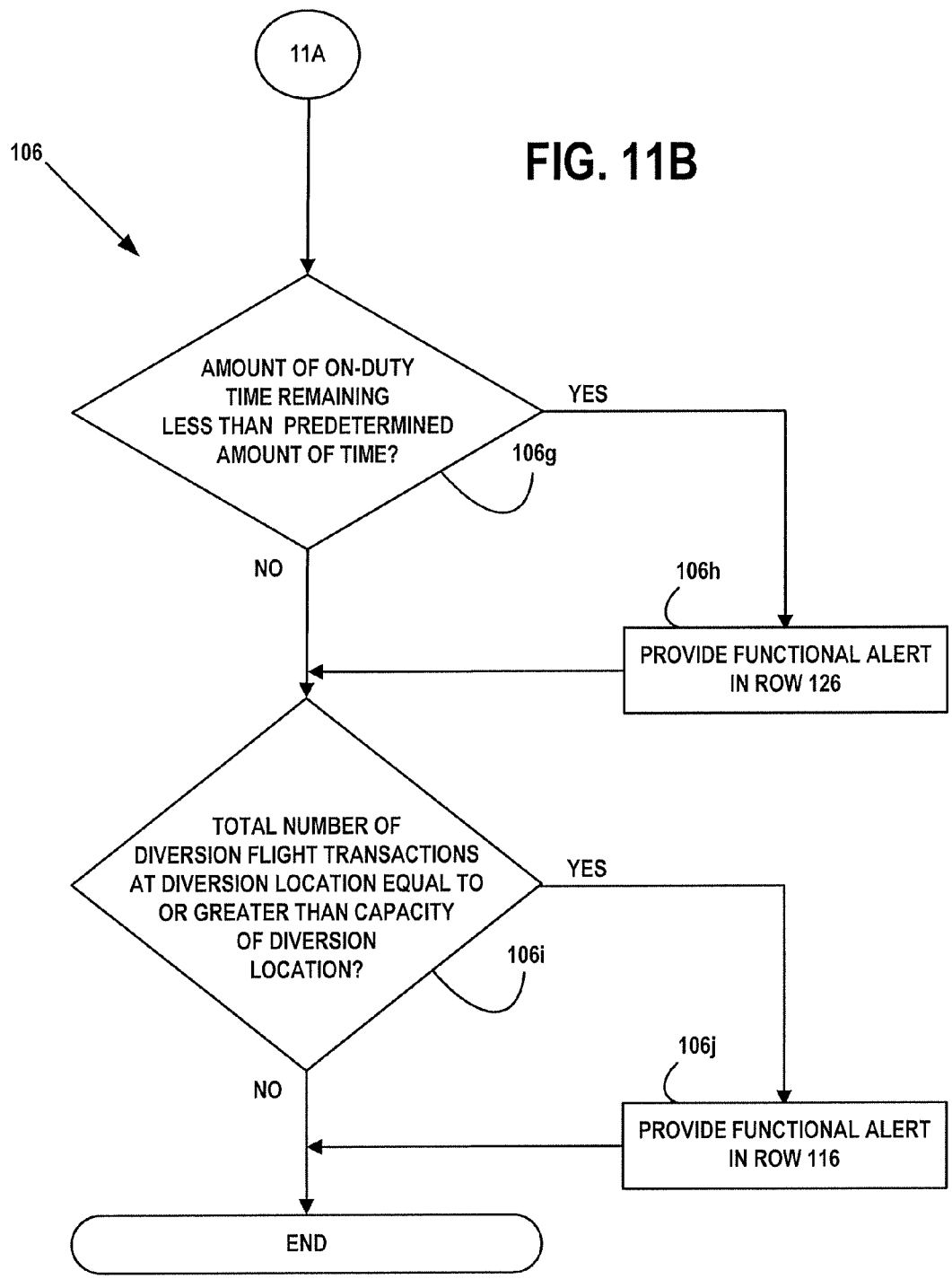

In an exemplary embodiment, as illustrated in FIGS. 11A and 11B with continuing reference to FIGS. 1-10, to provide functional alerts for diversion flight transactions in the step 106 of the method 94, functional alerts associated with the rows 114, 116, 126, 128, 132, 136, 138, 142, and/or any combination thereof, are displayed on the output device 56ac. For the purpose of clarity, the following description of the step 106 will address providing functional alerts associated with the row 126, which includes providing functional alerts associated with the rows 114 and 116. Moreover, since the row 126 is substantially identical to the row 86, reference numerals used to refer to the data parameter fields of the row 126 will correspond to the reference numerals used to refer to the data parameter fields of the row 86, except that the numeric prefix for the reference numerals used to describe the row 86, that is, 86, will be replaced with the numeric prefix used to describe the row 126, that is, 126.

As shown in FIGS. 11A and 11B, it is determined in step 106*a* whether the ground time in the ground time data parameter field 126*ba* is within a first predetermined time period such as, for example, greater than or equal to 90 minutes but less than 120 minutes. If so, then the ground time data parameter field 126*ba* is highlighted in a color in step 106*b* such as, for example, the color yellow, to thereby more clearly visually distinguish the ground time data parameter field 126*ba* from the other data parameter fields in the row 126, thereby providing a ground-time functional alert. In addition to providing a functional alert in the row 126, the step 106*b* further includes highlighting the field 118 in the row 114 displaying the diversion location for the diversion flight transaction specific to the row 126, in a color such as, for example, the color yellow, to thereby more clearly visually distinguish the highlighted field 118 from the other fields 118 in the row 114. For example, as shown in FIG. 10, the field 118 of the row 114 in which the code ABI is displayed is highlighted in the color yellow because ABI is the diversion location for the diversion flight transaction specific to the row 126.

It is determined in step 106*c* whether the ground time in the ground time data parameter field 126*ba* is within a second predetermined time period such as, for example, greater than or equal to 120 minutes but less than 180 minutes. If so, then the ground time data parameter field 126*ba* is highlighted in a color in step 106*d* such as, for example, the color orange, to thereby more clearly visually distinguish the ground time data parameter field 126*ba* from the other data parameter fields in the row 126, thereby providing a ground-time functional alert. In addition to providing a functional alert in the row 126, the step 106*d* further includes highlighting the field 118 in the row 114 displaying the diversion location for the diversion flight transaction specific to the row 126, in a color such as, for example, the color orange, to thereby more clearly visually distinguish the highlighted field 118 from the other fields 118 in the row 114. For example, as shown in FIG. 10, the field 118 of the row 114 in which the code ABI is displayed is highlighted in the color orange because ABI is the diversion location for the diversion flight transaction specific to the row 126.

It is determined in step 106*e* whether the ground time in the ground time data parameter field 126*ba* is within a third predetermined time period such as, for example, greater than or equal to 180 minutes. If so, then the ground time data parameter field 126*ba* is highlighted in a color in step 106*f* such as, for example, the color red, to thereby more clearly visually distinguish the ground time data parameter field 126*ba* from the other data parameter fields in the row 126, thereby providing a ground-time functional alert. In addition to providing a functional alert in the row 126, the step 106*f* further includes highlighting the field 118 in the row 114 displaying the diversion location for the diversion flight transaction specific to the row 126, in a color such as, for example, the color red, to thereby more clearly visually distinguish the highlighted field 118 from the other fields 118 in the row 114. For example, as shown in FIG. 10, the field 118 of the row 114 in which the code ABI is displayed is highlighted in the color red because ABI is the diversion location for the diversion flight transaction specific to the row 126.

In an exemplary embodiment, during one or more of the steps 106*b*, 106*d* and 106*f*, clicking on or otherwise selecting the field 118 in the row 114 displaying the corresponding ground-time functional alert causes the display outputted in the step 104 to scroll to the corresponding ground time data parameter field in the row below the row 124 displaying the ground time remaining which caused the ground-time functional alert to be provided in the row 114.

It is determined in step 106*g* whether the amount of on-duty time remaining in the DTR data parameter field 126*cd* is less than a predetermined amount of time, such as, for example, the amount of flight time required for the recovery leg 76, and/or a government-mandated amount of time. If so, then the DTR data parameter field 126*cd* is highlighted in a color in step 106*h* such as, for example, the color red, to thereby more clearly visually distinguish the DTR data parameter field 126*cd* from the other data parameter fields in the row 126, thereby providing a duty-time-remaining functional alert.

It is determined in step 106*i* whether the total number of diversion flight transactions, having the same diversion location as the diversion flight transaction specific to the data displayed in the row 126, is equal to or greater than airplane-loading capacity of that same diversion location. That is, it is determined in the step 106*i* whether the number in the data parameter field of the row 130 indicating the total number of diversion flight transactions having the diversion location of ABI is equal to or greater than the airplane-loading capacity of that same diversion location. If so, then the field 120 of the row 116 in which this same total number is displayed, i.e., the field 120 immediately below the field 118 in which the code ABI is displayed, is highlighted in a color such as, for example, the color red, in step 106*j* to thereby more clearly visually distinguish the highlighted field 120 from the other fields 120 in the row 116, thereby providing a diversion-location-capacity functional alert. In several exemplary embodiments, the determination in the step 106*i* takes into account all diversion flight transactions at a particular diversion location, regardless of airline, destination location, the filtering conducted in the step 98 of the method 94, and/or any combination thereof.

In several exemplary embodiments, instead of, or in addition to functional alerts regarding one or more of the data parameter fields 126*ba* and 126*cd*, one or more other functional alerts regarding one or more other data parameter fields are provided. In several exemplary embodiments, instead of, or in addition to color highlighting the data parameter fields 126*ba* and 126*cd*, one or more of the fields 118, one or more of the fields 120, and/or any combination thereof, the functional alerts are communicated by sounding an alarm, displaying a dialog box having, for example, a written warning message, playing a recording, and/or any combination thereof.

Providing functional alerts associated with the rows 128, 132, 136, 138 and 142 will not be described in detail because the description thereof is substantially similar to the foregoing discussion of providing functional alerts associated with the row 126.

In an exemplary embodiment, each of the steps 96, 98, 100, 102, 104 and 106 of the method 94 are executed simultaneously. As a result, new and/or updated data is continuously received in the step 96, and the above-described summaries and parameters outputted to the output device 56*ac* in the steps 100, 102 and 104 are continuously updated, thereby providing a real-time status of each of the diversion flight transactions. In an exemplary embodiment, the parameters outputted to the output device 56*ac* are continuously stored in the database 50, and, in addition to, or instead of providing a "live" or real-time status, the method 94 includes the option of outputting parameters based on past historical data by outputting the past output parameters stored in the database 50.

In an exemplary embodiment, the execution of the method 94 in the manner described above provides a real-time summary of diversion flight transactions per destination location, per airline, per diversion location, and/or any combination thereof.

In an exemplary embodiment, the execution of the method 94 in the manner described above provides the ability to manage diversion scenarios across multiple airlines.

In an exemplary embodiment, to execute the method 94 in the manner described above, the module 20 is employed and includes a real-time web application that monitors the diversion flight transactions, with the computer 46 hosting a website that is accessed via the remote user interface 56a.

In an exemplary embodiment, the execution of the method 94 provides critical information to assist with the diversion recovery process. In an exemplary embodiment, the alert functionality in the step 106 of the method 94 permits an immediate indication of excessive ground times, any overloading of airplanes at airports at one or more diversion locations, and low amounts of on-duty time remaining.

In an exemplary embodiment, the method 94 supports the planning, tracking and recovery of diversion flight transactions.

In several exemplary embodiments, as a result of the execution of the above-described method 94, multiple pieces of information or data (e.g., aircraft, crew, passenger, and/or FAA-related data) are consolidated from multiple sources (e.g., the DECS 54a, the RES 54b, the FAA 54c, the AGARS 54g, the one or more stations 54e, etc.) and displayed in a unified framework (e.g., the display of the rows 110, 114, 116, 122, 124, 126, 128, 130, 132, 134, 136, 138, 140, 142 and 144 on the output device 56ac) for multiple types of users (e.g., dispatchers, airline diversion coordinators, hub managers, spoke stations, station managers, airline management, etc.) for multiple purposes (e.g., diversion station loading, customer service tracking, diversion recovery management, etc.).

In an exemplary embodiment, the method 94 provides real-time updating of parameters associated with multiple diversion flight transactions. In an exemplary embodiment, the method 94, inter alia, monitors the amount of time that passengers spend in airplanes while the airplanes are, for example, on the ground at their respective diversion locations, thereby enabling the management of "sit" times.

In an exemplary embodiment, the method 94 facilitates better customer service on the part of the airline during challenging diversion scenarios. In an exemplary embodiment, the use of the remote user interface 56a in the manner described above facilitates common situational awareness to key decision-makers and stakeholders during diversion scenarios.

In several exemplary embodiments, instead of, or in addition to the remote user interface 56a, the remote user interface 56b is used to implement one or more of the steps of the method 94 in a manner substantially similar to the above-described manner by which the remote user interface 56a is used to implement one or more of the steps of the method 94. In several exemplary embodiments, instead of, or in addition to the remote user interfaces 56a and/or 56b, one or more other remote user interfaces are used to implement one or more of the steps of the method 94 in a manner substantially similar to the above-described manner by which the remote user interface 56a is used to implement one or more of the steps of the method 94.

Figure 12:
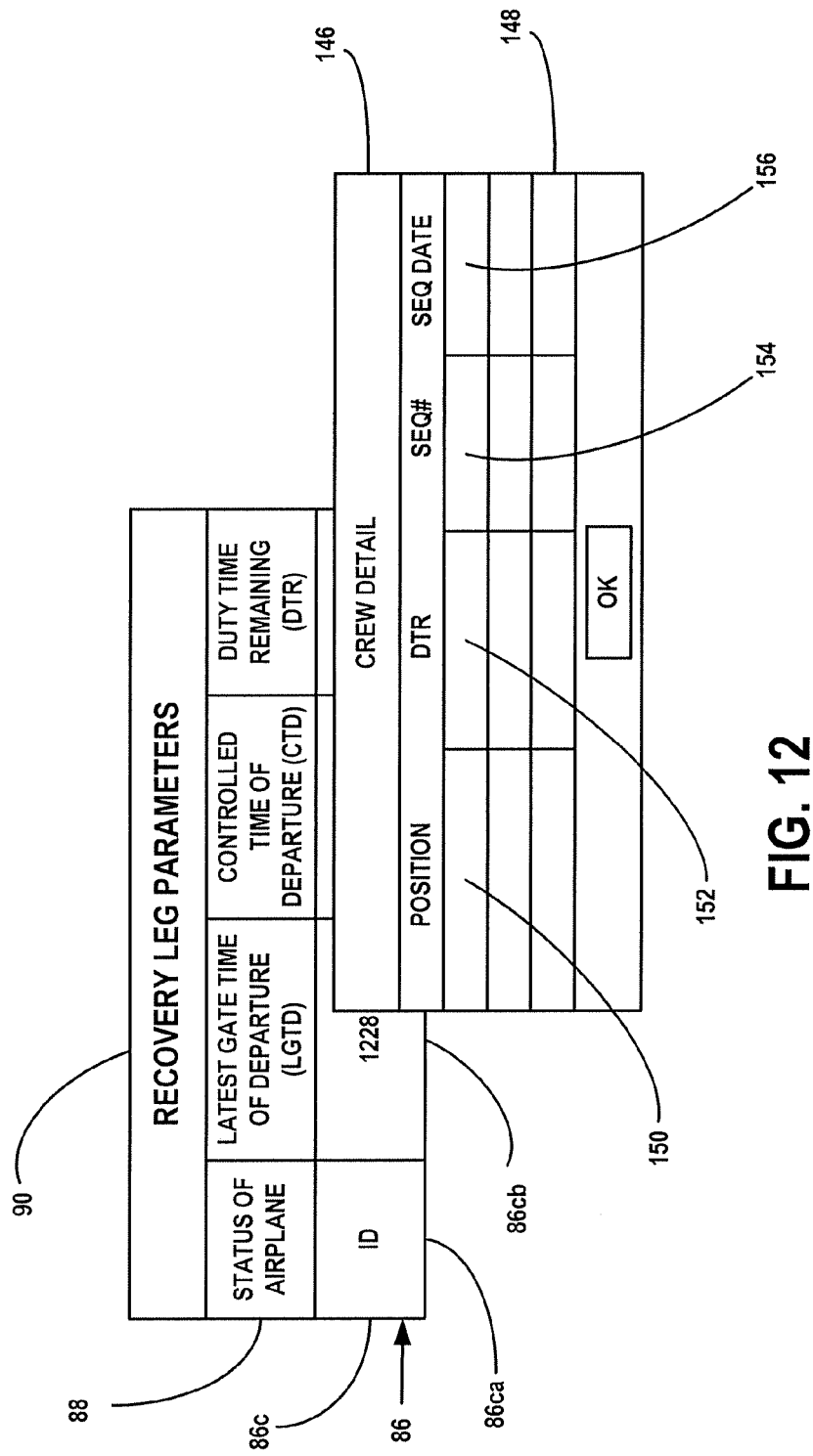
FIG. 12 is a diagrammatic illustration of an information box accessible by clicking on or otherwise selecting a portion of the output of FIG. 7C, according to an exemplary embodiment.

In an exemplary embodiment, as illustrated in FIG. 12 with continuing reference to FIGS. 1-11, during the step 82c of the method 78, additional information regarding the amount of time displayed in the DTR data parameter field 86cd is accessed by double clicking or otherwise selecting the field 86cd, which results in the display of an information box 146. The information box 146 includes a plurality of rows 148, each of the rows including a position data parameter field 150, a DTR data parameter field 152, a sequence number data parameter field 154, and a sequence date data parameter field 156. The position data parameter field 150 includes, for example, captain, flight attendant, etc., and the DTR data parameter field 152 includes the corresponding amount of on-duty time remaining.

Figure 13A:
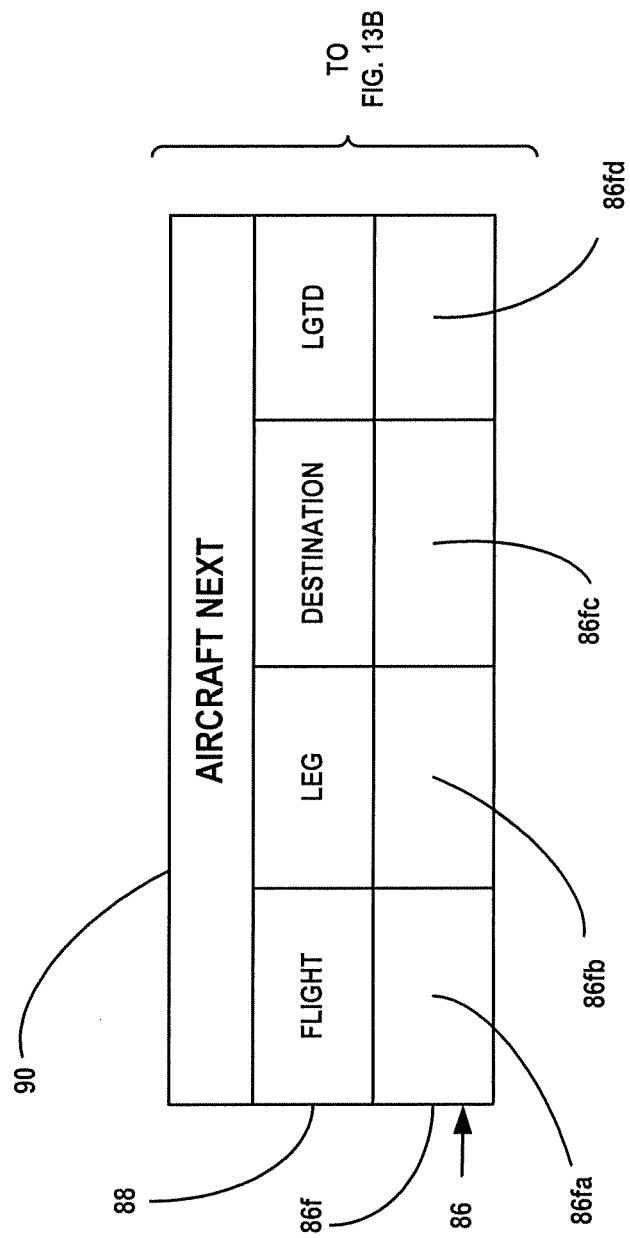
FIG. 13A is a diagrammatic illustration of a portion of an output generated during the step of outputting parameters of the method of FIG. 6, according to an exemplary embodiment.

In an exemplary embodiment, as illustrated in FIG. 13A with continuing reference to FIGS. 1-12, the row 86 further includes a section 86f, which displays information regarding the scheduled next flight transaction of the airplane 38 after completion of the diversion flight transaction 58. The section 86f includes a flight number data parameter field 86fa, a leg status data parameter field 86fb, a destination data parameter field 86fc, and a LGTD data parameter field 86fd. In an exemplary embodiment, the field 86fb either displays the code CXL to indicate that the flight has been canceled, or is blank to indicate that the flight has not been canceled. In an exemplary embodiment, one or more messages such as, for example, one or more text message are automatically and/or manually sent to appropriate personnel in the event the code CXL is displayed in the field 86fb, and/or in one or more other events.

Figure 13B:
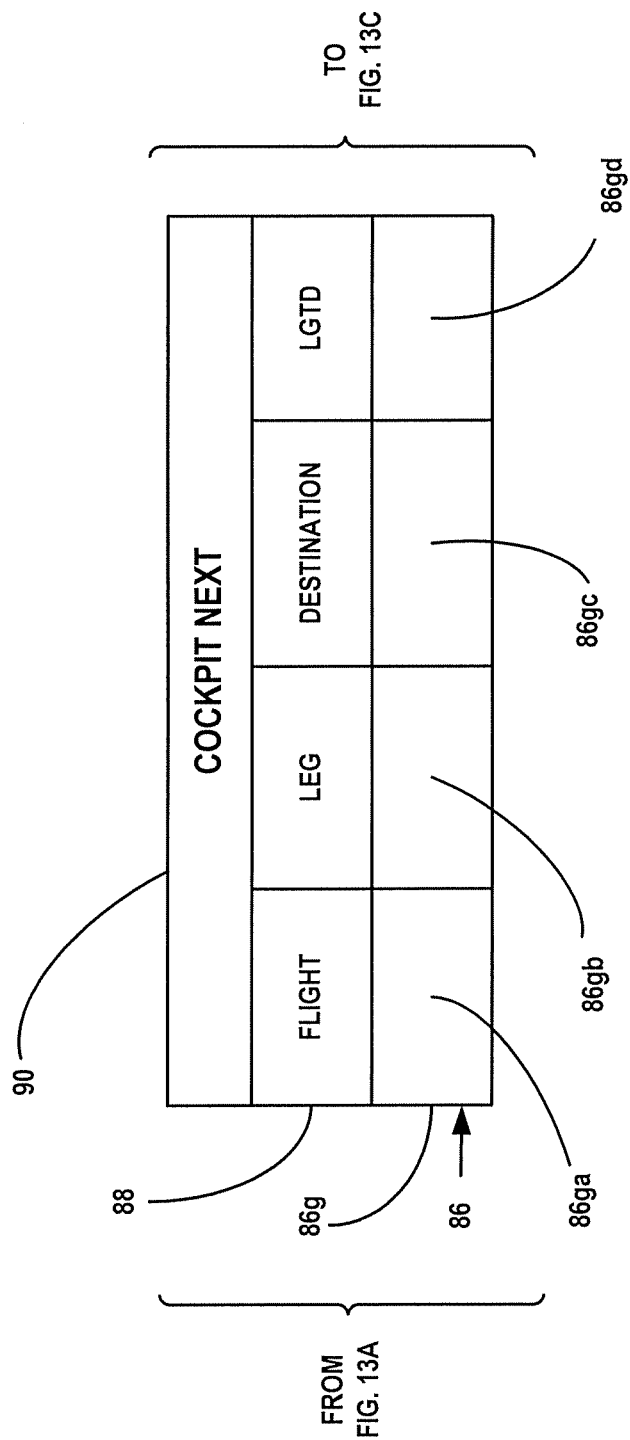
FIG. 13B is a diagrammatic illustration of another portion of the output generated during the step of outputting parameters of the method of FIG. 6, according to an exemplary embodiment.

In an exemplary embodiment, as illustrated in FIG. 13B with continuing reference to FIGS. 1-13A, the row 86 includes a section 86g, which displays information regarding the scheduled next flight transaction of the cockpit crew after completion of the diversion flight transaction 58. The section 86g includes a flight number data parameter field 86ga, a leg status data parameter field 86gb, a destination data parameter field 86gc, and a LGTD data parameter field 86gd. In an exemplary embodiment, the field 86gb either displays the code CXL to indicate that the flight has been canceled, or is blank to indicate that the flight has not been canceled. In an exemplary embodiment, one or more messages such as, for example, one or more text message are automatically and/or manually sent to appropriate personnel in the event the code CXL is displayed in the field 86gb, and/or in one or more other events.

Figure 13C:
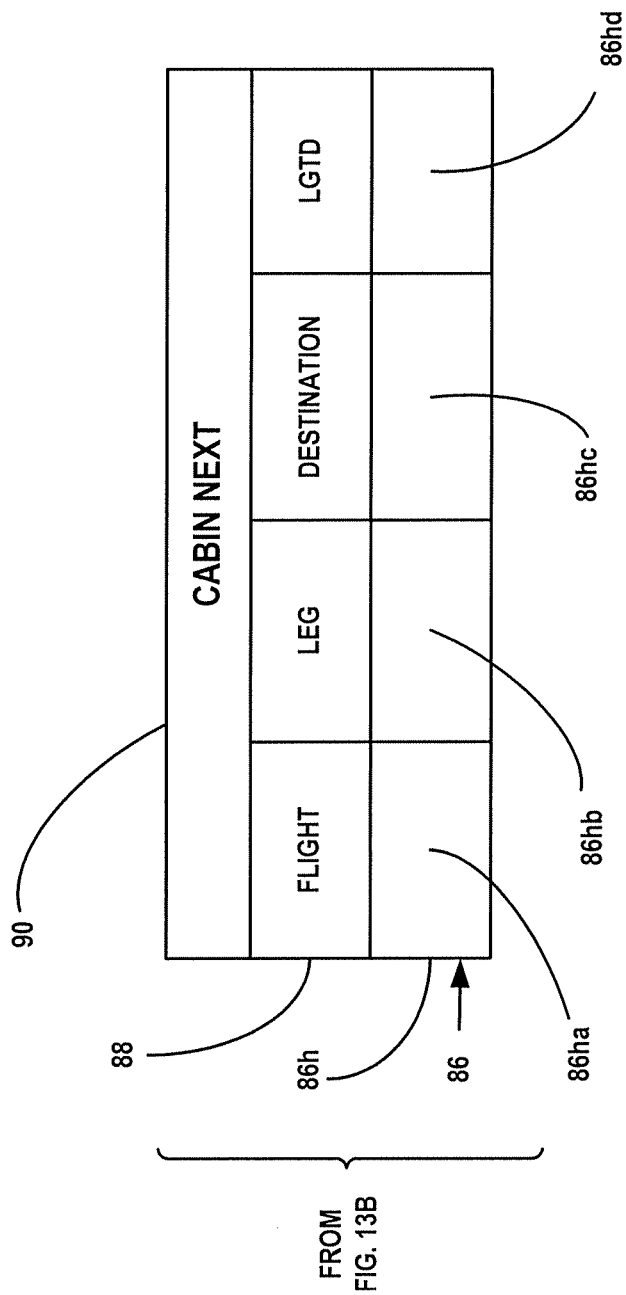
FIG. 13C is a diagrammatic illustration of yet another portion of the output generated during the step of outputting parameters of the method of FIG. 6, according to an exemplary embodiment.

In an exemplary embodiment, as illustrated in FIG. 13C with continuing reference to FIGS. 1-13B, the row 86 includes a section 86h, which displays information regarding the scheduled next flight transaction of the cabin crew after completion of the diversion flight transaction 58. The section 86h includes a flight number data parameter field 86ha, a leg status data parameter field 86hb, a destination data parameter field 86hc, and a LGTD data parameter field 86hd. In an exemplary embodiment, the field 86hb either displays the code CXL to indicate that the flight has been canceled, or is blank to indicate that the flight has not been canceled. In an exemplary embodiment, one or more messages such as, for example, one or more text message are automatically and/or manually sent to appropriate personnel in the event the code CXL is displayed in the field 86hb, and/or in one or more other events.

Figure 14:
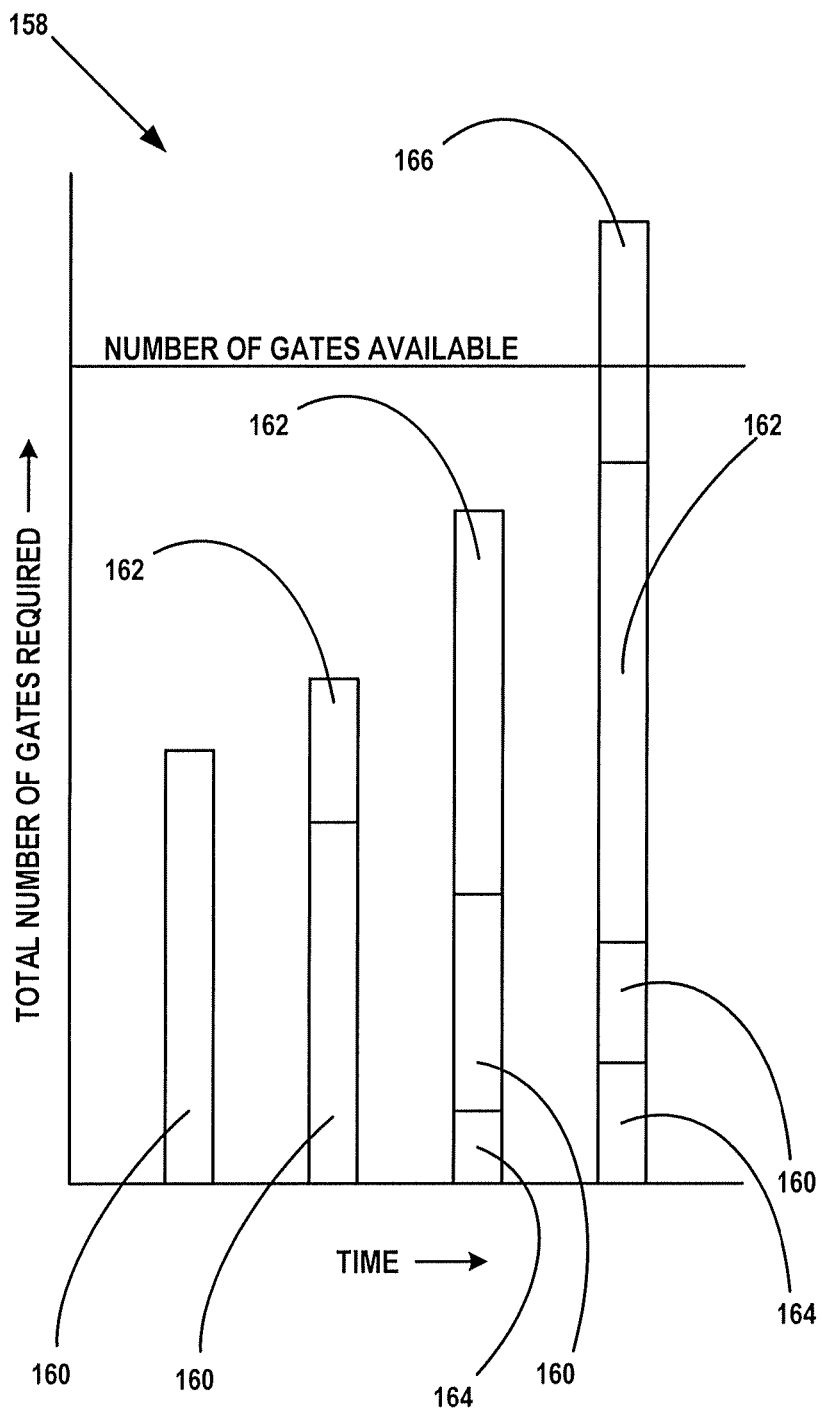
FIG. 14 is a diagrammatic illustration of output generated during the method of FIG. 9, according to an exemplary embodiment.

In an exemplary embodiment, as illustrated in FIG. 14 with continuing reference to FIGS. 1-13, the method 94 includes generating a gate demand chart 158. In an exemplary embodiment, the gate demand chart 158 plots a total number of gates required versus time for a specific station 54e, such as, for example, a hub or the destination location 42. In an exemplary embodiment, at a particular time, the number of gates required are divided into one or more of the following groups: a gate group 160 for flights that are at respective gates at the particular time, a gate group 162 for flights that are in transit and expected to be at respective gates at the particular time, a gate group 164 for flights that are scheduled to be at respective gates at the particular time, and a gate group 166 for diverted flights that are expected to return to respective gates at the particular time. In an exemplary embodiment, the chart 158 provides a "macro" picture of the gate usage for the rest of the day to assist in determining whether flights need to be canceled in order to create space for returning diverted flights.

In an exemplary embodiment, the operation of the system 36, the method 78 and/or the method 94 includes diversion recovery, permitting the prioritization and metering of flights back to the destination location 42 based on crew, gate and passenger data.

In an exemplary embodiment, the operation of the system 36, the method 78 and/or the method 94 includes diversion planning, providing a real-time summary of diversion location or station loading.

In an exemplary embodiment, the operation of the system 36, the method 78 and/or the method 94 includes diversion monitoring or tracking, providing a real-time status of all diversion and recovery flights and passenger ground times.

In several exemplary embodiments, during the operation of the system 36, the method 78 and/or the method 94, the module 20 exports information to one or more of the engine 12 and the modules 14, 16, 18, 22, 24, 26, 28, 30, 32 and 34, and/or any combination thereof.

Figure 15:
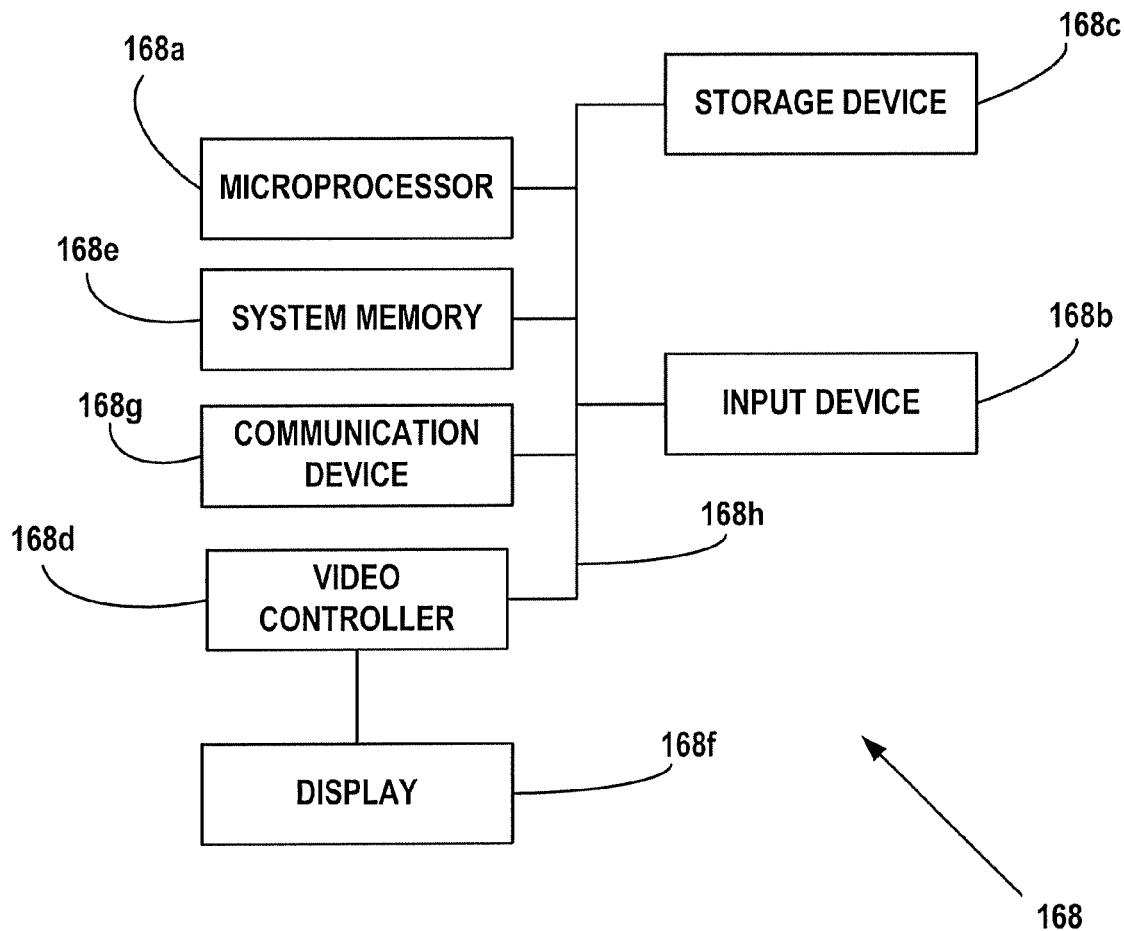
FIG. 15 is a diagrammatic illustration of a node for implementing one or more exemplary embodiments of the present disclosure.

In an exemplary embodiment, as illustrated in FIG. 15 with continuing reference to FIGS. 1-14, an illustrative node 168 for implementing one or more embodiments of one or more of the above-described networks, elements, methods and/or steps, and/or any combination thereof, is depicted. The node 168 includes a microprocessor 168a, an input device 168b, a storage device 168c, a video controller 168d, a system memory 168e, a display 168f, and a communication device 168g all interconnected by one or more buses 168h. In several exemplary embodiments, the storage device 168c may include a floppy drive, hard drive, CD-ROM, optical drive, any other form of storage device and/or any combination thereof. In several exemplary embodiments, the storage device 168c may include, and/or be capable of receiving, a floppy disk, CD-ROM, DVD-ROM, or any other form of computer-readable medium that may contain executable instructions. In several exemplary embodiments, the communication device 168g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the engine 12, the functional modules 14, 16, 18, 20, 22, 24, 26, 28, 30, 32 and 34, the network 52, the remote user interfaces 56a and 56b, the computer 46, the DECS 54a, the RES 54b, the FAA 54c, the OSO 54d, the stations 54e, the FOS 54f, and the AGARS 54g, is, or at least includes, the node 168 and/or components thereof, and/or one or more nodes that are substantially similar to the node 168 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PLDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code. In several exemplary embodiments, data signals could be carried across transmission mediums and store and transport various data structures, and, thus, may be used to transport an embodiment of the present disclosure.

In several exemplary embodiments, the network 16, and/or one or more portions thereof, may be designed to work on any specific architecture. In an exemplary embodiment, one or more portions of the network 16 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A method has been described that includes receiving data associated with a first diverted transportation transaction from one or more data sources; outputting a first set of parameters specific to the first diverted transportation transaction in response to receiving data associated with the first diverted transportation transaction; and providing one or more functional alerts specific to the first diverted transportation transaction. In an exemplary embodiment, the first diverted transportation transaction is a first diversion flight transaction comprising a first diversion leg, a first ground time period, and a first recovery leg; and wherein outputting the first set of parameters comprises outputting one or more parameters associated with the first diversion leg; outputting one or more parameters associated with the first ground time period; and outputting one or more parameters associated with the first recovery leg. In an exemplary embodiment, the first diversion flight transaction further comprises a first minimum duty time period remaining; wherein providing one or more functional alerts comprises if the first ground time period is greater than or equal to a first predetermined time period, then providing a first ground-time functional alert; and if the first minimum duty time period remaining is less than a second predetermined time period, then providing a first duty-time-remaining functional alert. In an exemplary embodiment, the first diversion flight transaction further comprises a first diversion location at which the first diversion leg terminates, the first diversion location having a first capacity; and wherein outputting the first set of parameters further comprises outputting one or more parameters associated with an aircraft communication addressing and reporting system; and outputting one or more parameters associated with the first diversion location. In an exemplary embodiment, the first diversion flight transaction further comprises a first aircraft having a next leg, a first cockpit crew having a next leg, and a first cabin crew having a next leg; wherein outputting the first set of parameters further comprises outputting one or more parameters associated with the next leg of the first aircraft; outputting one or more parameters associated with the next leg of the first cockpit crew; and outputting one or more parameters associated with the next leg of the first cabin crew. In an exemplary embodiment, the method comprises receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg; outputting a second set of parameters specific to the second diversion flight transaction in response to receiving data associated with the second diversion flight transaction, comprising outputting one or more parameters associated with the second diversion leg; outputting one or more parameters associated with the second ground time period; outputting one or more parameters associated with the second recovery leg; outputting one or more parameters associated with the aircraft communication addressing and reporting system; outputting one or more parameters associated with the second diversion location; outputting one or more parameters associated with the next leg of the second aircraft; outputting one or more parameters associated with the next leg of the second cockpit crew; and outputting one or more parameters associated with the next leg of the second cabin crew; providing one or more functional alerts specific to the second diversion flight transaction, comprising if the second ground time period is greater than or equal to a second predetermined time period, then providing a second ground-time functional alert; and if the second minimum duty time period remaining is less than a second predetermined time period, then providing a second duty-time-remaining functional alert; outputting a summary of diversion flight transactions by destination location, comprising outputting a parameter indicating the first destination location; outputting a first total number of diversion flight transactions for which the first destination location is the destination location so that the first total number is associated with the parameter indicating the first destination location; outputting a parameter indicating the second destination location; and outputting a second total number of diversion flight transactions for which the second destination location is the destination location so that the second total number is associated with the parameter indicating the second destination location; and outputting a summary of diversion flight transactions by diversion location for at least one of the first and second destination locations, comprising outputting a parameter indicating the first diversion location; outputting a third total number of diversion flight transactions for which the first diversion location is the diversion location so that the third total number is associated with the parameter indicating the first diversion location; outputting a parameter indicating the second diversion location; and outputting a fourth total number of diversion flight transactions for which the second diversion location is the diversion location so that the second total number is associated with the parameter indicating the second diversion location; wherein, if the at least one of the first and second destination locations is the first destination location, then the sum of the third and fourth total numbers is equal to or less than the first total number of diversion flight transactions for which the first destination location is the destination location; and wherein, if the at least one of the first and second destination locations is the second destination location, then the sum of the third and fourth total numbers is equal to or less than the second total number of diversion flight transactions for which the second destination location is the destination location. In an exemplary embodiment, the method comprises receiving data from one or more data sources specific to one or more other diversion flight transactions, each of the other diversion flight transactions comprising one diversion location in a plurality of diversion locations, the plurality of diversion locations comprising the first diversion location; wherein providing one or more functional alerts further comprises if the total number of diversion flight transactions for which the first diversion location is the diversion location is equal to or greater than the first capacity, then providing a first diversion-location-capacity functional alert. In an exemplary embodiment, the first diverted transportation transaction is a first diversion flight transaction comprising a first airline; wherein outputting the first set of parameters comprises outputting the first set of parameters onto a display; and wherein the method further comprises receiving data associated with a second diversion flight transaction from one or more data sources, the second diversion flight transaction comprising a second airline; outputting a second set of parameters specific to the second diversion flight transaction in response to receiving data associated with the second diversion flight transaction, comprising outputting the second set of parameters onto the display; and filtering the first and second sets of parameter by airline, comprising removing one of the first and second sets of parameters from the display. In an exemplary embodiment, the method comprises providing an operational data source and forecasting engine; forecasting one or more projected times using the engine; forecasting one or more probable times using the engine; and forecasting one or more postable times using the engine; wherein the projected times, the probable times, and the postable times are associated with a plurality of transportation transactions, the plurality of transportation transactions comprising the first diverted transportation transaction; wherein receiving data associated with the first diverted transportation transaction from one or more data sources comprises issuing a query for data associated with the plurality of transportation transactions using the engine; and wherein outputting the first set of parameters comprises outputting a time selected from the group consisting of the one or more projected times, the one or more probable times, and the one or more postable times.

A computer readable medium has been described that includes a plurality of instructions stored therein, the instructions comprising instructions for receiving data associated with a first diverted transportation transaction from one or more data sources; instructions for outputting a first set of parameters specific to the first diverted transportation transaction in response to receiving data associated with the first diverted transportation transaction; and instructions for providing one or more functional alerts specific to the first diverted transportation transaction. In an exemplary embodiment, the first diverted transportation transaction is a first diversion flight transaction comprising a first diversion leg, a first ground time period, and a first recovery leg; and wherein instructions outputting the first set of parameters comprise instructions for outputting one or more parameters associated with the first diversion leg; instructions for outputting one or more parameters associated with the first ground time period; and instructions for outputting one or more parameters associated with the first recovery leg. In an exemplary embodiment, the first diversion flight transaction further comprises a first minimum duty time period remaining; wherein instructions for providing one or more functional alerts comprise instructions for if the first ground time period is greater than or equal to a first predetermined time period, then providing a first ground-time functional alert; and instructions for if the first minimum duty time period remaining is less than a second predetermined time period, then providing a first duty-time-remaining functional alert. In an exemplary embodiment, the first diversion flight transaction further comprises a first diversion location at which the first diversion leg terminates, the first diversion location having a first capacity; and wherein instructions for outputting the first set of parameters further comprise instructions for outputting one or more parameters associated with an aircraft communication addressing and reporting system; and instructions for outputting one or more parameters associated with the first diversion location. In an exemplary embodiment, the first diversion flight transaction further comprises a first aircraft having a next leg, a first cockpit crew having a next leg, and a first cabin crew having a next leg; wherein instructions for outputting the first set of parameters further comprise instructions for outputting one or more parameters associated with the next leg of the first aircraft; instructions for outputting one or more parameters associated with the next leg of the first cockpit crew; and instructions for outputting one or more parameters associated with the next leg of the first cabin crew. In an exemplary embodiment, the plurality of instructions further comprises instructions for receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg; instructions for outputting a second set of parameters specific to the second diversion flight transaction in response to receiving data associated with the second diversion flight transaction, comprising instructions for outputting one or more parameters associated with the second diversion leg; instructions for outputting one or more parameters associated with the second ground time period; instructions for outputting one or more parameters associated with the second recovery leg; instructions for outputting one or more parameters associated with the aircraft communication addressing and reporting system; instructions for outputting one or more parameters associated with the second diversion location; instructions for outputting one or more parameters associated with the next leg of the second aircraft; instructions for outputting one or more parameters associated with the next leg of the second cockpit crew; and instructions for outputting one or more parameters associated with the next leg of the second cabin crew; instructions for providing one or more functional alerts specific to the second diversion flight transaction, comprising instructions for if the second ground time period is greater than or equal to a second predetermined time period, then providing a second ground-time functional alert; and instructions for if the second minimum duty time period remaining is less than a second predetermined time period, then providing a second duty-time-remaining functional alert; instructions for outputting a summary of diversion flight transactions by destination location, comprising instructions for outputting a parameter indicating the first destination location; instructions for outputting a first total number of diversion flight transactions for which the first destination location is the destination location so that the first total number is associated with the parameter indicating the first destination location; instructions for outputting a parameter indicating the second destination location; and instructions for outputting a second total number of diversion flight transactions for which the second destination location is the destination location so that the second total number is associated with the parameter indicating the second destination location; and instructions for outputting a summary of diversion flight transactions by diversion location for at least one of the first and second destination locations, comprising instructions for outputting a parameter indicating the first diversion location; instructions for outputting a third total number of diversion flight transactions for which the first diversion location is the diversion location so that the third total number is associated with the parameter indicating the first diversion location; instructions for outputting a parameter indicating the second diversion location; and instructions for outputting a fourth total number of diversion flight transactions for which the second diversion location is the diversion location so that the second total number is associated with the parameter indicating the second diversion location; wherein, if the at least one of the first and second destination locations is the first destination location, then the sum of the third and fourth total numbers is equal to or less than the first total number of diversion flight transactions for which the first destination location is the destination location; and wherein, if the at least one of the first and second destination locations is the second destination location, then the sum of the third and fourth total numbers is equal to or less than the second total number of diversion flight transactions for which the second destination location is the destination location. In an exemplary embodiment, the plurality of instructions further comprises instructions for receiving data from one or more data sources specific to one or more other diversion flight transactions, each of the other diversion flight transactions comprising one diversion location in a plurality of diversion locations, the plurality of diversion locations comprising the first diversion location; wherein instructions for providing one or more functional alerts further comprise instructions for if the total number of diversion flight transactions for which the first diversion location is the diversion location is equal to or greater than the first capacity, then providing a first diversion-location-capacity functional alert. In an exemplary embodiment, the first diverted transportation transaction is a first diversion flight transaction comprising a first airline; wherein instructions for outputting the first set of parameters comprise instructions for outputting the first set of parameters onto a display; and wherein the plurality of instructions further comprises instructions for receiving data associated with a second diversion flight transaction from one or more data sources, the second diversion flight transaction comprising a second airline; instructions for outputting a second set of parameters specific to the second diversion flight transaction in response to receiving data associated with the second diversion flight transaction, comprising instructions for outputting the second set of parameters onto the display; and instructions for filtering the first and second sets of parameter by airline, comprising instructions for removing one of the first and second sets of parameters from the display. In an exemplary embodiment, the plurality of instructions further comprises instructions for providing an operational data source and forecasting engine; instructions for forecasting one or more projected times using the engine; instructions for forecasting one or more probable times using the engine; and instructions for forecasting one or more postable times using the engine; wherein the projected times, the probable times, and the postable times are associated with a plurality of transportation transactions, the plurality of transportation transactions comprising the first diverted transportation transaction; wherein instructions for receiving data associated with the first diverted transportation transaction from one or more data sources comprise instructions for issuing a query for data associated with the plurality of transportation transactions using the engine; and wherein instructions for outputting the first set of parameters comprise instructions for outputting a time selected from the group consisting of the one or more projected times, the one or more probable times, and the one or more postable times.

A system has been described that includes means for receiving data associated with a first diverted transportation transaction from one or more data sources; means for outputting a first set of parameters specific to the first diverted transportation transaction in response to receiving data associated with the first diverted transportation transaction; and means for providing one or more functional alerts specific to the first diverted transportation transaction. In an exemplary embodiment, the first diverted transportation transaction is a first diversion flight transaction comprising a first diversion leg, a first ground time period, and a first recovery leg; and wherein means for outputting the first set of parameters comprises means for outputting one or more parameters associated with the first diversion leg; means for outputting one or more parameters associated with the first ground time period; and means for outputting one or more parameters associated with the first recovery leg. In an exemplary embodiment, the first diversion flight transaction further comprises a first minimum duty time period remaining; wherein means for providing one or more functional alerts comprises means for if the first ground time period is greater than or equal to a first predetermined time period, then providing a first ground-time functional alert; and means for if the first minimum duty time period remaining is less than a second predetermined time period, then providing a first duty-time-remaining functional alert. In an exemplary embodiment, the first diversion flight transaction further comprises a first diversion location at which the first diversion leg terminates, the first diversion location having a first capacity; and wherein means for outputting the first set of parameters further comprises means for outputting one or more parameters associated with an aircraft communication addressing and reporting system; and means for outputting one or more parameters associated with the first diversion location. In an exemplary embodiment, the first diversion flight transaction further comprises a first aircraft having a next leg, a first cockpit crew having a next leg, and a first cabin crew having a next leg; wherein means for outputting the first set of parameters further comprises means for outputting one or more parameters associated with the next leg of the first aircraft; means for outputting one or more parameters associated with the next leg of the first cockpit crew; and means for outputting one or more parameters associated with the next leg of the first cabin crew. In an exemplary embodiment, means for receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg; means for outputting a second set of parameters specific to the second diversion flight transaction in response to receiving data associated with the second diversion flight transaction, comprising means for outputting one or more parameters associated with the second diversion leg; means for outputting one or more parameters associated with the second ground time period; means for outputting one or more parameters associated with the second recovery leg; means for outputting one or more parameters associated with the aircraft communication addressing and reporting system; means for outputting one or more parameters associated with the second diversion location; means for outputting one or more parameters associated with the next leg of the second aircraft; means for outputting one or more parameters associated with the next leg of the second cockpit crew; and means for outputting one or more parameters associated with the next leg of the second cabin crew; means for providing one or more functional alerts specific to the second diversion flight transaction, comprising means for if the second ground time period is greater than or equal to a second predetermined time period, then providing a second ground-time functional alert; and means for if the second minimum duty time period remaining is less than a second predetermined time period, then providing a second duty-time-remaining functional alert; means for outputting a summary of diversion flight transactions by destination location, comprising means for outputting a parameter indicating the first destination location; means for outputting a first total number of diversion flight transactions for which the first destination location is the destination location so that the first total number is associated with the parameter indicating the first destination location; means for outputting a parameter indicating the second destination location; and means for outputting a second total number of diversion flight transactions for which the second destination location is the destination location so that the second total number is associated with the parameter indicating the second destination location; and means for outputting a summary of diversion flight transactions by diversion location for at least one of the first and second destination locations, comprising means for outputting a parameter indicating the first diversion location; means for outputting a third total number of diversion flight transactions for which the first diversion location is the diversion location so that the third total number is associated with the parameter indicating the first diversion location; means for outputting a parameter indicating the second diversion location; and means for outputting a fourth total number of diversion flight transactions for which the second diversion location is the diversion location so that the second total number is associated with the parameter indicating the second diversion location; wherein, if the at least one of the first and second destination locations is the first destination location, then the sum of the third and fourth total numbers is equal to or less than the first total number of diversion flight transactions for which the first destination location is the destination location; and wherein, if the at least one of the first and second destination locations is the second destination location, then the sum of the third and fourth total numbers is equal to or less than the second total number of diversion flight transactions for which the second destination location is the destination location. In an exemplary embodiment, the system comprises means for receiving data from one or more data sources specific to one or more other diversion flight transactions, each of the other diversion flight transactions comprising one diversion location in a plurality of diversion locations, the plurality of diversion locations comprising the first diversion location; wherein means for providing one or more functional alerts further comprises means for if the total number of diversion flight transactions for which the first diversion location is the diversion location is equal to or greater than the first capacity, then providing a first diversion-location-capacity functional alert. In an exemplary embodiment, the first diverted transportation transaction is a first diversion flight transaction comprising a first airline; wherein means for outputting the first set of parameters comprises means for outputting the first set of parameters onto a display; and wherein the system further comprises means for receiving data associated with a second diversion flight transaction from one or more data sources, the second diversion flight transaction comprising a second airline; means for outputting a second set of parameters specific to the second diversion flight transaction in response to receiving data associated with the second diversion flight transaction, comprising means for outputting the second set of parameters onto the display; and means for filtering the first and second sets of parameter by airline, comprising removing one of the first and second sets of parameters from the display. In an exemplary embodiment, the system comprises means for providing an operational data source and forecasting engine; means for forecasting one or more projected times using the engine; means for forecasting one or more probable times using the engine; and means for forecasting one or more postable times using the engine; wherein the projected times, the probable times, and the postable times are associated with a plurality of transportation transactions, the plurality of transportation transactions comprising the first diverted transportation transaction; wherein means for receiving data associated with the first diverted transportation transaction from one or more data sources comprises means for issuing a query for data associated with the plurality of transportation transactions using the engine; and wherein means for outputting the first set of parameters comprises means for outputting a time selected from the group consisting of the one or more projected times, the one or more probable times, and the one or more postable times.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping transaction in which a ship travels from one port to one or more other ports. In an exemplary embodiment, aspects of the present disclosure are readily applicable and/or readily adaptable to a trucking transaction during which a truck travels from one city to one or more other cities. In an exemplary embodiment, aspects of the present disclosure are readily applicable and/or readily adaptable to a rail transaction during which a train travels from one city or station to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method comprising:
   receiving, using a computer system, data associated with a first diverted transportation transaction from one or more data sources, wherein the first diverted transportation transaction is a first diversion flight transaction having associated therewith: a first aircraft, a first departure location, a first destination location, a first diversion location having a first capacity, a first diversion leg from the first departure location to the first diversion location, a first ground time period, which equals a time period between when the first aircraft touches ground at the first diversion location and when the first aircraft takes off from the first diversion location, a first recovery leg from the first diversion location to the first destination location, and a first minimum duty time period remaining;
   receiving, using the computer system, data from one or more data sources specific to one or more other diversion flight transactions, each of the other diversion flight transactions comprising one diversion location in a plurality of diversion locations, the plurality of diversion locations comprising the first diversion location;
   outputting, using the computer system, a first set of parameters specific to the first diverted transportation transaction in response to receiving data associated with the first diverted transportation transaction, comprising: outputting one or more parameters associated with the first diversion leg; outputting one or more parameters associated with the first ground time period; and outputting one or more parameters associated with the first recovery leg;
   determining if the first ground time period for the first diversion flight transaction is greater than or equal to a first predetermined time period;
   if the first ground time period for the first diversion flight transaction is greater than or equal to the first predetermined time period, then providing a first ground-time functional alert;
   determining if the first ground time period for the first diversion flight transaction is greater than or equal to a second predetermined time period that is greater than the first predetermined time period;
   if the first ground time period for the first diversion flight transaction is greater than or equal to the second predetermined time period, then providing a second ground-time functional alert that is different than, and distinguishable from, the first ground-time functional alert;
   determining if the first ground time period for the first diversion flight transaction is greater than or equal to a third predetermined time period that is greater than the second predetermined time period;
   if the first ground time period for the first diversion flight transaction is greater than or equal to the third predetermined time period, then providing a third ground-time functional alert that is different than, and distinguishable from, each of the first and second ground-time functional alerts;
   determining if the first minimum duty time period remaining for the first diversion flight transaction is less than a fourth predetermined time period;
   if the first minimum duty time period remaining is less than the fourth predetermined time period, then providing a first duty-time-remaining functional alert that is different than, and distinguishable from, each of the first, second and third ground-time functional alerts;
   determining if the total number of diversion flight transactions for which the first diversion location is the diversion location is equal to or greater than the first capacity; and
   if the total number of diversion flight transactions for which the first diversion location is the diversion location is equal to or greater than the first capacity, then providing a first diversion-location-capacity functional alert that is different than, and distinguishable from, the first duty-time-remaining functional alert and each of the first, second and third ground-time functional alerts.

2. The method of claim 1 wherein outputting the first set of parameters further comprises:
   outputting one or more parameters associated with an aircraft communication addressing and reporting system; and
   outputting one or more parameters associated with the first diversion location.

3. The method of claim 2 wherein the first aircraft has a next leg;
   wherein the first diversion flight transaction further has associated therewith a first cockpit crew having a next leg, and a first cabin crew having a next leg; and
   wherein outputting the first set of parameters further comprises:
      outputting one or more parameters associated with the next leg of the first aircraft;
      outputting one or more parameters associated with the next leg of the first cockpit crew; and
      outputting one or more parameters associated with the next leg of the first cabin crew.

4. The method of claim 3 further comprising:
   receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg;
   outputting a second set of parameters specific to the second diversion flight transaction in response to receiving data associated with the second diversion flight transaction, comprising:
      outputting one or more parameters associated with the second diversion leg;
      outputting one or more parameters associated with the second ground time period;
      outputting one or more parameters associated with the second recovery leg;
      outputting one or more parameters associated with the aircraft communication addressing and reporting system;
      outputting one or more parameters associated with the second diversion location;
      outputting one or more parameters associated with the next leg of the second aircraft;

outputting one or more parameters associated with the next leg of the second cockpit crew; and outputting one or more parameters associated with the next leg of the second cabin crew;

outputting a summary of diversion flight transactions by destination location, comprising:
  outputting a parameter indicating the first destination location;
  outputting a first total number of diversion flight transactions for which the first destination location is the destination location so that the first total number is associated with the parameter indicating the first destination location;
  outputting a parameter indicating the second destination location; and
  outputting a second total number of diversion flight transactions for which the second destination location is the destination location so that the second total number is associated with the parameter indicating the second destination location; and outputting a summary of diversion flight transactions by diversion location for the first destination location, comprising:
  outputting a parameter indicating the first diversion location;
  outputting a third total number of diversion flight transactions for which the first diversion location is the diversion location so that the third total number is associated with the parameter indicating the first diversion location;
  outputting a parameter indicating the second diversion location; and
  outputting a fourth total number of diversion flight transactions for which the second diversion location is the diversion location so that the second total number is associated with the parameter indicating the second diversion location;
  wherein the sum of the third and fourth total numbers is equal to or less than the first total number of diversion flight transactions for which the first destination location is the destination location.

5. The method of claim 1 wherein the first diversion flight transaction is associated with a first airline;
wherein outputting the first set of parameters comprises outputting the first set of parameters onto a display; and
wherein the method further comprises:
  receiving data associated with a second diversion flight transaction from one or more data sources, the second diversion flight transaction being associated with a second airline;
  outputting a second set of parameters specific to the second diversion flight transaction in response to receiving data associated with the second diversion flight transaction, comprising outputting the second set of parameters onto the display; and
  filtering the first and second sets of parameters by airline, comprising:
    removing one of the first and second sets of parameters from the display.

6. The method of claim 1 further comprising:
providing an operational data source and forecasting engine;
forecasting one or more projected times using the engine;
forecasting one or more probable times using the engine; and
forecasting one or more postable times using the engine;

wherein the projected times, the probable times, and the postable times are associated with a plurality of transportation transactions, the plurality of transportation transactions comprising the first diverted transportation transaction;
wherein receiving data associated with the first diverted transportation transaction from one or more data sources comprises:
  issuing a query for data associated with the plurality of transportation transactions using the engine; and
wherein outputting the first set of parameters comprises:
  outputting a time selected from the group consisting of the one or more projected times, the one or more probable times, and the one or more postable times.

7. A computer readable medium that is non-transitory, the computer readable medium comprising a plurality of instructions stored therein, the instructions comprising:
  instructions for receiving data associated with a first diverted transportation transaction from one or more data sources, wherein the first diverted transportation transaction is a first diversion flight transaction having associated therewith: a first aircraft, a first departure location, a first destination location, a first diversion location having a first capacity, a first diversion leg from the first departure location to the first diversion location, a first ground time period, which equals a time period between when the first aircraft touches ground at the first diversion location and when the first aircraft takes off from the first diversion location, a first recovery leg from the first diversion location to the first destination location, and a first minimum duty time period remaining;
  instructions for receiving data from one or more data sources specific to one or more other diversion flight transactions, each of the other diversion flight transactions comprising one diversion location in a plurality of diversion locations, the plurality of diversion locations comprising the first diversion location;
  instructions for outputting a first set of parameters specific to the first diverted transportation transaction in response to receiving data associated with the first diverted transportation transaction, comprising: instructions for outputting one or more parameters associated with the first diversion leg; instructions for outputting one or more parameters associated with the first ground time period; and instructions for outputting one or more parameters associated with the first recovery leg;
  instructions for determining if the first ground time period for the first diversion flight transaction is greater than or equal to a first predetermined time period;
  instructions for if the first ground time period for the first diversion flight transaction is greater than or equal to the first predetermined time period, then providing a first ground-time functional alert;
  instructions for determining if the first ground time period for the first diversion flight transaction is greater than or equal to a second predetermined time period that is greater than the first predetermined time period;
  instructions for if the first ground time period for the first diversion flight transaction is greater than or equal to the second predetermined time period, then providing a second ground-time functional alert that is different than, and distinguishable from, the first ground-time functional alert;
  instructions for determining if the first ground time period for the first diversion flight transaction is greater than or equal to a third predetermined time period that is greater than the second predetermined time period;

instructions for if the first ground time period for the first diversion flight transaction is greater than or equal to the third predetermined time period, then providing a third ground-time functional alert that is different than, and distinguishable from, each of the first and second ground-time functional alerts;

instructions for determining if the first minimum duty time period remaining for the first diversion flight transaction is less than a fourth predetermined time period;

instructions for if the first minimum duty time period remaining is less than the fourth predetermined time period, then providing a first duty-time-remaining functional alert that is different than, and distinguishable from, each of the first, second and third ground-time functional alerts;

instructions for determining if the total number of diversion flight transactions for which the first diversion location is the diversion location is equal to or greater than the first capacity; and instructions for if the total number of diversion flight transactions for which the first diversion location is the diversion location is equal to or greater than the first capacity, then providing a first diversion-location-capacity functional alert that is different than, and distinguishable from, the first duty-time-remaining functional alert and each of the first, second and third ground-time functional alerts.

8. The computer readable medium of claim 7 wherein instructions for outputting the first set of parameters further comprise:
   instructions for outputting one or more parameters associated with an aircraft communication addressing and reporting system; and
   instructions for outputting one or more parameters associated with the first diversion location.

9. The computer readable medium of claim 8 wherein the first aircraft has a next leg; wherein the first diversion flight transaction further has associated therewith a first cockpit crew having a next leg, and a first cabin crew having a next leg; and
   wherein instructions for outputting the first set of parameters further comprise:
      instructions for outputting one or more parameters associated with the next leg of the first aircraft;
      instructions for outputting one or more parameters associated with the next leg of the first cockpit crew; and
      instructions for outputting one or more parameters associated with the next leg of the first cabin crew.

10. The computer readable medium of claim 9 wherein the plurality of instructions further comprises:
    instructions for receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg;
    instructions for outputting a second set of parameters specific to the second diversion flight transaction in response to receiving data associated with the second diversion flight transaction, comprising:
       instructions for outputting one or more parameters associated with the second diversion leg;
       instructions for outputting one or more parameters associated with the second ground time period;
       instructions for outputting one or more parameters associated with the second recovery leg;
       instructions for outputting one or more parameters associated with the aircraft communication addressing and reporting system;
       instructions for outputting one or more parameters associated with the second diversion location;
       instructions for outputting one or more parameters associated with the next leg of the second aircraft;
       instructions for outputting one or more parameters associated with the next leg of the second cockpit crew; and
       instructions for outputting one or more parameters associated with the next leg of the second cabin crew;
    instructions for outputting a summary of diversion flight transactions by destination location, comprising:
       instructions for outputting a parameter indicating the first destination location;
       instructions for outputting a first total number of diversion flight transactions for which the first destination location is the destination location so that the first total number is associated with the parameter indicating the first destination location;
       instructions for outputting a parameter indicating the second destination location; and
       instructions for outputting a second total number of diversion flight transactions for which the second destination location is the destination location so that the second total number is associated with the parameter indicating the second destination location;
    and
    instructions for outputting a summary of diversion flight transactions by diversion location for the first destination location, comprising:
       instructions for outputting a parameter indicating the first diversion location;
       instructions for outputting a third total number of diversion flight transactions for which the first diversion location is the diversion location so that the third total number is associated with the parameter indicating the first diversion location;
       instructions for outputting a parameter indicating the second diversion location; and
       instructions for outputting a fourth total number of diversion flight transactions for which the second diversion location is the diversion location so that the second total number is associated with the parameter indicating the second diversion location;
       wherein the sum of the third and fourth total numbers is equal to or less than the first total number of diversion flight transactions for which the first destination location is the destination location.

11. The computer readable medium of claim 7 wherein the first diversion flight transaction is associated with a first airline;
    wherein instructions for outputting the first set of parameters comprise instructions for outputting the first set of parameters onto a display; and
    wherein the plurality of instructions further comprises:
       instructions for receiving data associated with a second diversion flight transaction from one or more data sources, the second diversion flight transaction being associated with a second airline;

instructions for outputting a second set of parameters specific to the second diversion flight transaction in response to receiving data associated with the second diversion flight transaction, comprising instructions for outputting the second set of parameters onto the display; and instructions for filtering the first and second sets of parameters by airline, comprising:

instructions for removing one of the first and second sets of parameters from the display.

12. The computer readable medium of claim 7 wherein the plurality of instructions further comprises:

instructions for providing an operational data source and forecasting engine;

instructions for forecasting one or more projected times using the engine;

instructions for forecasting one or more probable times using the engine; and instructions for forecasting one or more postable times using the engine;

wherein the projected times, the probable times, and the postable times are associated with a plurality of transportation transactions, the plurality of transportation transactions comprising the first diverted transportation transaction;

wherein instructions for receiving data associated with the first diverted transportation transaction from one or more data sources comprise:

instructions for issuing a query for data associated with the plurality of transportation transactions using the engine;

and wherein instructions for outputting the first set of parameters comprise:

instructions for outputting a time selected from the group consisting of the one or more projected times, the one or more probable times, and the one or more postable times.

13. A system comprising:

means for receiving data associated with a first diverted transportation transaction from one or more data sources, wherein the first diverted transportation transaction is a first diversion flight transaction having associated therewith: a first aircraft, a first departure location, a first destination location, a first diversion location having a first capacity, a first diversion leg from the first departure location to the first diversion location, a first ground time period, which equals a time period between when the first aircraft touches ground at the first diversion location and when the first aircraft takes off from the first diversion location, a first recovery leg from the first diversion location to the first destination location, and a first minimum duty time period remaining;

means for receiving data from one or more data sources specific to one or more other diversion flight transactions, each of the other diversion flight transactions comprising one diversion location in a plurality of diversion locations, the plurality of diversion locations comprising the first diversion location;

means for outputting a first set of parameters specific to the first diverted transportation transaction in response to receiving data associated with the first diverted transportation transaction, comprising: means for outputting one or more parameters associated with the first diversion leg; means for outputting one or more parameters associated with the first ground time period; and means for outputting one or more parameters associated with the first recovery leg;

means for determining if the first ground time period for the first diversion flight transaction is greater than or equal to a first predetermined time period;

means for if the first ground time period for the first diversion flight transaction is greater than or equal to the first predetermined time period, then providing a first ground-time functional alert;

means for determining if the first ground time period for the first diversion flight transaction is greater than or equal to a second predetermined time period that is greater than the first predetermined time period;

means for if the first ground time period for the first diversion flight transaction is greater than or equal to the second predetermined time period, then providing a second ground-time functional alert that is different than, and distinguishable from, the first ground-time functional alert;

means for determining if the first ground time period for the first diversion flight transaction is greater than or equal to a third predetermined time period that is greater than the second predetermined time period;

means for if the first ground time period for the first diversion flight transaction is greater than or equal to the third predetermined time period, then providing a third ground-time functional alert that is different than, and distinguishable from, each of the first and second ground-time functional alerts;

means for determining if the first minimum duty time period remaining for the first diversion flight transaction is less than a fourth predetermined time period;

means for if the first minimum duty time period remaining is less than a second the fourth predetermined time period, then providing a first duty-time-remaining functional alert that is different than, and distinguishable from, each of the first, second and third ground-time functional alerts; and means for determining if the total number of diversion flight transactions for which the first diversion location is the diversion location is equal to or greater than the first capacity; and means for if the total number of diversion flight transactions for which the first diversion location is the diversion location is equal to or greater than the first capacity, then providing a first diversion-location-capacity functional alert that is different than, and distinguishable from, the first duty-time-remaining functional alert and each of the first, second and third ground-time functional alerts.

14. The system of claim 13 wherein means for outputting the first set of parameters further comprises:

means for outputting one or more parameters associated with an aircraft communication addressing and reporting system; and means for outputting one or more parameters associated with the first diversion location.

15. The system of claim 14 wherein the first aircraft has a next leg;

wherein the first diversion flight transaction further has associated therewith a first cockpit crew having a next leg, and a first cabin crew having a next leg; and wherein means for outputting the first set of parameters further comprises:

means for outputting one or more parameters associated with the next leg of the first aircraft;

means for outputting one or more parameters associated with the next leg of the first cockpit crew; and means for outputting one or more parameters associated with the next leg of the first cabin crew.

16. The system of claim 15 further comprising:

means for receiving data associated with a second diversion flight transaction from one or more data sources, the second diversion flight transaction comprising a second diversion leg, a second ground time period, a second recovery leg, a second minimum duty time period remaining, a second diversion location at which the second diversion leg terminates, the second diversion location having a second capacity, a second aircraft having a next leg, a second cockpit crew having a next leg, and a second cabin crew having a next leg;

means for outputting a second set of parameters specific to the second diversion flight transaction in response to receiving data associated with the second diversion flight transaction, comprising:

means for outputting one or more parameters associated with the second diversion leg;

means for outputting one or more parameters associated with the second ground time period;

means for outputting one or more parameters associated with the second recovery leg;

means for outputting one or more parameters associated with the aircraft communication addressing and reporting system;

means for outputting one or more parameters associated with the second diversion location;

means for outputting one or more parameters associated with the next leg of the second aircraft;

means for outputting one or more parameters associated with the next leg of the second cockpit crew; and means for outputting one or more parameters associated with the next leg of the second cabin crew;

means for outputting a summary of diversion flight transactions by destination location, comprising:

means for outputting a parameter indicating the first destination location;

means for outputting a first total number of diversion flight transactions for which the first destination location is the destination location so that the first total number is associated with the parameter indicating the first destination location;

means for outputting a parameter indicating the second destination location; and means for outputting a second total number of diversion flight transactions for which the second destination location is the destination location so that the second total number is associated with the parameter indicating the second destination location;

and means for outputting a summary of diversion flight transactions by diversion location for the first destination location, comprising:

means for outputting a parameter indicating the first diversion location;

means for outputting a third total number of diversion flight transactions for which the first diversion location is the diversion location so that the third total number is associated with the parameter indicating the first diversion location;

means for outputting a parameter indicating the second diversion location; and means for outputting a fourth total number of diversion flight transactions for which the second diversion location is the diversion location so that the second total number is associated with the parameter indicating the second diversion location;

wherein the sum of the third and fourth total numbers is equal to or less than the first total number of diversion flight transactions for which the first destination location is the destination location.

17. The system of claim 13 wherein the first diversion flight transaction is associated with a first airline;

wherein means for outputting the first set of parameters comprises means for outputting the first set of parameters onto a display; and wherein the system further comprises:

means for receiving data associated with a second diversion flight transaction from one or more data sources, the second diversion flight transaction being associated with a second airline;

means for outputting a second set of parameters specific to the second diversion flight transaction in response to receiving data associated with the second diversion flight transaction, comprising means for outputting the second set of parameters onto the display; and means for filtering the first and second sets of parameters by airline, comprising:

removing one of the first and second sets of parameters from the display.

18. The system of claim 13 further comprising:

means for providing an operational data source and forecasting engine;

means for forecasting one or more projected times using the engine;

means for forecasting one or more probable times using the engine; and means for forecasting one or more postable times using the engine;

wherein the projected times, the probable times, and the postable times are associated with a plurality of transportation transactions, the plurality of transportation transactions comprising the first diverted transportation transaction;

wherein means for receiving data associated with the first diverted transportation transaction from one or more data sources comprises:

means for issuing a query for data associated with the plurality of transportation transactions using the engine;

and wherein means for outputting the first set of parameters comprises:

means for outputting a time selected from the group consisting of the one or more projected times, the one or more probable times, and the one or more postable times.

* * * * *